United States Patent
Bonica

(10) Patent No.: US 11,902,153 B1
(45) Date of Patent: Feb. 13, 2024

(54) COMPRESSED ROUTING HEADER

(71) Applicant: Juniper Networks, Inc., Sunnyvale, CA (US)

(72) Inventor: Ronald Bonica, Sterling, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/644,609

(22) Filed: Dec. 16, 2021

Related U.S. Application Data

(63) Continuation of application No. 16/236,216, filed on Dec. 28, 2018, now Pat. No. 11,245,617.

(51) Int. Cl.
| | | |
|---|---|---|
| *H04L 45/00* | (2022.01) | |
| *H04L 45/741* | (2022.01) | |
| *H04L 45/745* | (2022.01) | |
| *H04L 69/22* | (2022.01) | |
| *H04L 69/04* | (2022.01) | |

(52) U.S. Cl.
CPC ............ *H04L 45/34* (2013.01); *H04L 45/741* (2013.01); *H04L 45/745* (2013.01); *H04L 69/04* (2013.01); *H04L 69/22* (2013.01)

(58) Field of Classification Search
CPC ..... H04L 45/34; H04L 45/741; H04L 45/745; H04L 69/04; H04L 69/22
See application file for complete search history.

(56) References Cited

U.S. PATENT DOCUMENTS

| 6,791,982 | B2 | 9/2004 | Westberg |
| 9,722,878 | B2 | 8/2017 | Filsfils et al. |
| 9,838,311 | B2 | 12/2017 | Ashwood-Smith |

(Continued)

FOREIGN PATENT DOCUMENTS

| CN | 1377549 A | 10/2002 |
| CN | 105052090 A | 11/2015 |

(Continued)

OTHER PUBLICATIONS

Bonica R., et al., "The IPV6 Compressed Routing Header (CRH)", Retrieved from https://tools.ietf.org/id/draft-bonica-6man-comp-rtg-hdr-03.txt, Mar. 23, 2019, 14 pages.

(Continued)

*Primary Examiner* — Oleg Survillo
*Assistant Examiner* — Monishwar Mohan
(74) *Attorney, Agent, or Firm* — Harrity & Harrity, LLP

(57) ABSTRACT

A node receives an internet protocol (IP) payload packet that includes an IPv6 transport header that has been extended with a compressed routing header (CRH). The CRH includes a list of segment identifiers (SIDs) that identify nodes that the IP payload packet is to traverse. The node determines, by referencing the list of SIDs, a next segment for the IP payload packet. The node updates a destination IP address that is included in the IPv6 transport header to a particular destination IP address of a next-hop node. The node updates a remaining segments value, included in the CRH, that identifies a number of segments left in a route of the IP payload packet. The node provides the IP payload packet to the next-hop node to allow the next-hop node to route the IP payload packet to another node in the network or to a destination device.

20 Claims, 14 Drawing Sheets

(56) References Cited

U.S. PATENT DOCUMENTS

| | | |
|---|---|---|
| 10,135,734 B1 | 11/2018 | Singh et al. |
| 10,419,982 B1 | 9/2019 | Gundavelli et al. |
| 2005/0129023 A1 | 6/2005 | Jagannathan et al. |
| 2012/0047573 A1* | 2/2012 | Duncan ............... H04L 63/1425 726/13 |
| 2014/0269422 A1 | 9/2014 | Filsfils et al. |
| 2014/0369356 A1 | 12/2014 | Bryant et al. |
| 2015/0109902 A1 | 4/2015 | Kumar et al. |
| 2015/0256456 A1 | 9/2015 | Previdi et al. |
| 2016/0173366 A1* | 6/2016 | Saad ...................... H04L 45/22 370/389 |
| 2016/0352654 A1* | 12/2016 | Filsfils ................... H04L 45/46 |
| 2017/0064717 A1* | 3/2017 | Filsfils ................... H04L 45/50 |
| 2017/0250907 A1 | 8/2017 | Pignataro et al. |
| 2017/0257684 A1 | 9/2017 | Anand et al. |
| 2017/0346737 A1* | 11/2017 | Previdi ................... H04L 69/22 |
| 2018/0034727 A1 | 2/2018 | Nainar et al. |
| 2018/0083871 A1 | 3/2018 | Filsfils et al. |
| 2018/0198705 A1 | 7/2018 | Wang et al. |
| 2018/0375766 A1* | 12/2018 | Filsfils ................... H04L 69/22 |
| 2018/0375968 A1 | 12/2018 | Bashandy et al. |
| 2019/0036818 A1* | 1/2019 | Nainar ................... H04L 45/34 |
| 2019/0104058 A1 | 4/2019 | Filsfils et al. |
| 2019/0149449 A1 | 5/2019 | Morris |
| 2019/0190818 A1* | 6/2019 | Ceccarelli ............... H04L 45/52 |
| 2019/0215267 A1 | 7/2019 | Filsfils et al. |
| 2019/0260657 A1 | 8/2019 | Filsfils et al. |
| 2019/0273813 A1 | 9/2019 | Mirsky |
| 2019/0288873 A1 | 9/2019 | Camarillo Garvia et al. |
| 2019/0288940 A1 | 9/2019 | Filsfils et al. |
| 2019/0303562 A1* | 10/2019 | Masputra .............. H04L 69/164 |
| 2019/0394211 A1 | 12/2019 | Filsfils et al. |
| 2020/0099610 A1 | 3/2020 | Heron et al. |
| 2020/0128469 A1 | 4/2020 | Akhavain Mohammadi |
| 2020/0153732 A1 | 5/2020 | Negi et al. |
| 2020/0322261 A1 | 10/2020 | Hu et al. |
| 2020/0358698 A1 | 11/2020 | Song et al. |
| 2020/0366763 A1 | 11/2020 | Bonica et al. |
| 2021/0176169 A1 | 6/2021 | Chen |

FOREIGN PATENT DOCUMENTS

| | | |
|---|---|---|
| CN | 106330714 A | 1/2017 |
| CN | 106411738 A | 2/2017 |
| CN | 107113204 A | 8/2017 |
| CN | 107342939 A | 11/2017 |
| CN | 107566272 A | 1/2018 |
| CN | 108156077 A | 6/2018 |
| CN | 108809759 A | 11/2018 |
| CN | 109067652 A | 12/2018 |
| EP | 3739823 A1 | 11/2020 |
| WO | 2017016254 A1 | 2/2017 |

OTHER PUBLICATIONS

Co-pending U.S. Appl. No. 16/236,216, inventor Bonica; Ronald, filed Dec. 28, 2018.

Extended European Search Report for Application No. EP19181594. 3, dated Dec. 20, 2019, 10 pages.

Extended European Search Report for Application No. EP19200194. 9, dated Jan. 24, 2020, 12 pages.

Filsfils C., et al., "IPv6 Segment Routing Header (SRH)", Retrieved from https://tools.ietf.org/id/draft-ietf-6man-segment-routing-header-18.txt, Apr. 5, 2019, 26 pages.

Filsfils C., et al., "Segment Routing with MPLS data plane", Retrieved from https://tools.ietf.org/id/draft-ietf-spring-segment-routingmpls-18.txt, Dec. 9, 2018, 32 pages.

Filsfils C., et al., "IPv6 Segment Routing Header (SRH); draft-ietf-6man-segment-routing-header-15.txt", Internet Engineering Task Force (IETF), Internet Society (IS0C), No. 15, Oct. 22, 2018, pp. 1-28, XP015129321.

Filsfils C., et al., "Segment Routing Architecture; rfc8402.txt", Internet Engineering Task Force (IETF), Internet Society (ISOC) 4, Jul. 31, 2018, pp. 1-32, XP015126362, [Retrieved on Jul. 25, 2018].

Filsfils C., et al., "Internet Engineering Task Force (IETF) Segment Routing Architecture," Jul. 2018, pp. 1-32, XP055718271, [retrieved on Jul. 27, 2020] Retrieved from the Internet [URL: https://tools.ietf.org/pdf/rfc8402.pdf].

Lebrun., "Implementing IPv6 Segment Routing in the Linux Kernel," IEE, 2016. 7 pages.

Mirsky G., et al., "Unified Identifier in IPv6 Segment Routing Networks draft-mirsky-6man-unified-id-sr-01," https://tools.ietf.org/pdf/draft-mirsky-6man-unified-id-sr-01.pdf, Oct. 10, 2018, 7 pages.

Previdi S., et al., "IS-IS Extensions for Segment Routing", Retrieved from https://tools.ietf.org/id/draft-ietf-isis-segment-routing-extensions-24.txt, Apr. 17, 2019, 28 pages.

Psenak P., et al., "IS-IS Extensions to Support Routing over IPv6 Dataplane", Retrieved from https://tools.ietf.org/id/draft-bashandy-sis-srv6-extensions-05.txt, Mar. 6, 2019, 19 pages.

\* cited by examiner

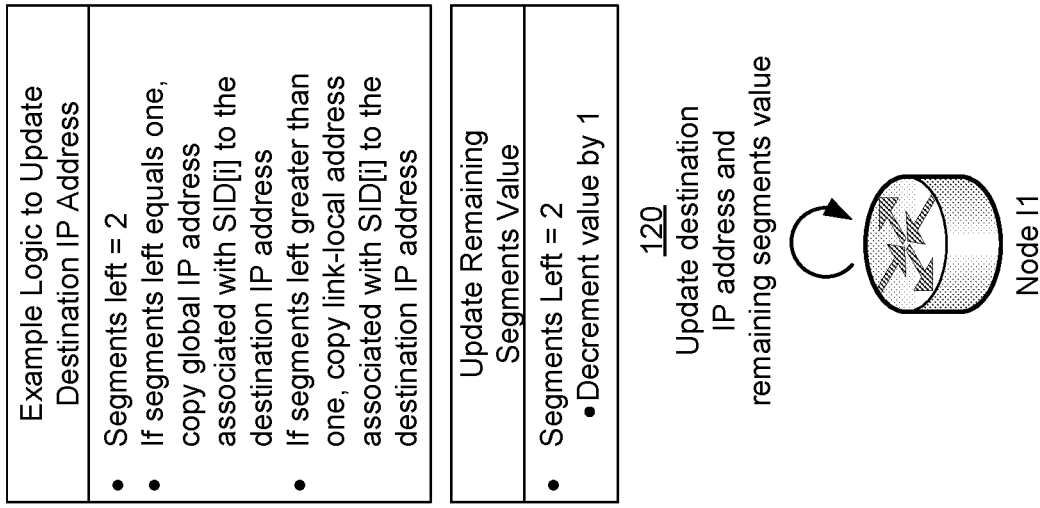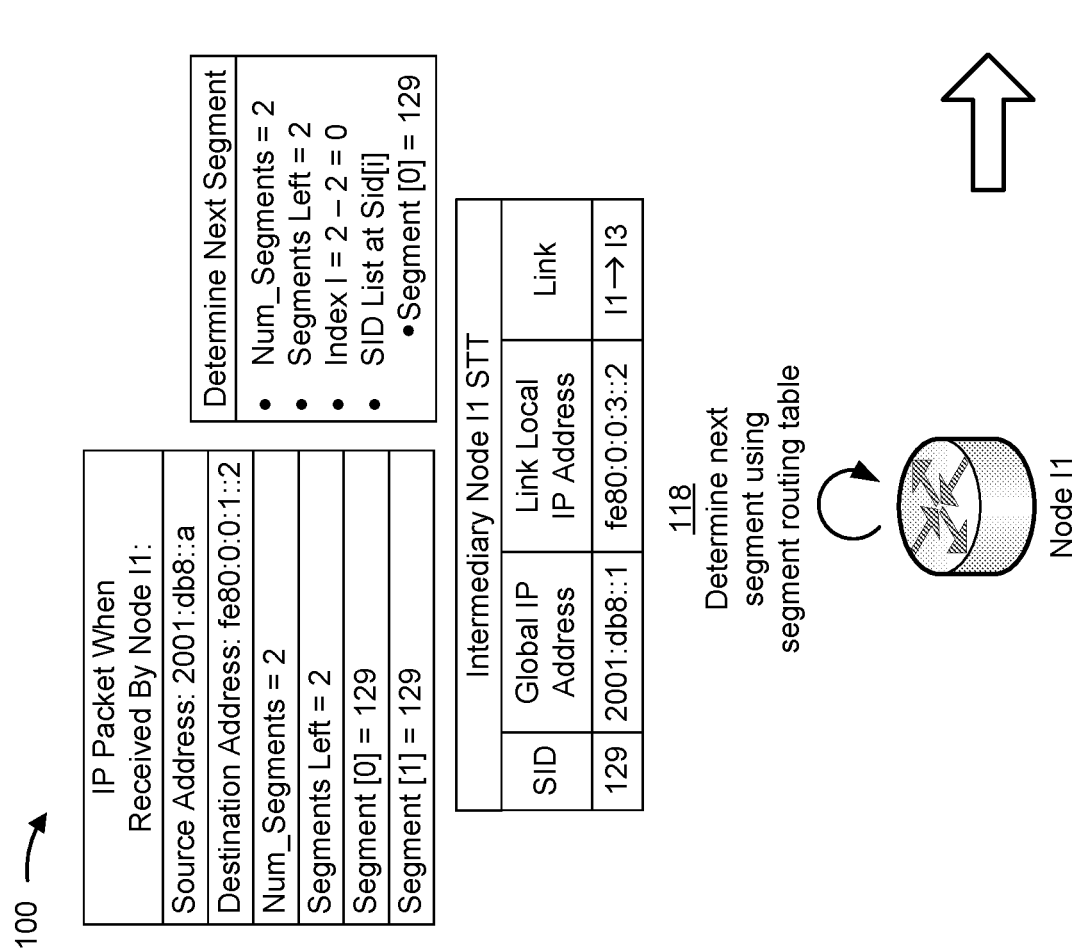
FIG. 1E

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Next Header  |  Hdr Ext Len  | Routing Type  | Segments Left |
+-+-+-+-+-+-+-+-+-+-+-+-+-+-+-+-+-+-+-+-+-+-+-+-+-+-+-+-+-+-+-+-+
| Num Segments |Con|  Reserved  |           SID List
+-+-+-+-+-+-+-+-+-+-+-+-+-+-+-+-+-+-+-+-+-+-+-+-+-+-+-+-+-+-+-+-+
```

CRH 200

FIG. 2

COMPRESSED ROUTING HEADER

RELATED APPLICATION

This application is a continuation of U.S. patent application Ser. No. 16/236,216, filed Dec. 28, 2018, which is incorporated herein by reference in its entirety.

BACKGROUND

An internet protocol (IP) source node, such as an IPv6 node, can steer a payload packet through a specific path to a destination. For example, the source node may define the path as an ordered list of segments and may encode the path in an IPv6 routing header.

SUMMARY

According to some implementations, a method may include receiving, by a node, an internet protocol (IP) payload packet that has been encapsulated using an IPv6 transport header. The IPv6 transport header may include a destination IP address of the node. The IPv6 transport header may have been extended with a compressed routing header (CRH). The CRH may include a list of segment identifiers (SIDs) that identify a set of nodes that the IP payload packet is to traverse while being routed through a network. The method may include determining, by the node and by referencing the list of SIDs included in the CRH, a next segment for the IP payload packet. The method may include updating, by the node and based on determining the next segment, the destination IP address to a particular destination IP address of a next-hop node. The method may include updating, by the node, a remaining segments value, that is included in the CRH, that identifies a number of segments left in a route of the IP payload packet. The method may include providing, by the node, the IP payload packet that includes the CRH to the next-hop node to allow the next-hop node to route the IP payload packet to another node in the network or to a destination device.

According to some implementations, a node may include one or more memories, and one or more processors, to receive an internet protocol (IP) payload packet that that has been encapsulated using an IPv6 transport header that has been extended with a compressed routing header (CRH). The CRH may include a list of segment identifiers (SIDs) that identify a set of nodes that the IP payload packet is to traverse while being routed through a network. The list of SIDs may have variable lengths between eight bits and sixty-four bits. The one or more processors may determine, by referencing the list of SIDs, a next segment for the IP payload packet. The one or more processors may update, based on determining the next segment, a destination IP address to a particular destination IP address of a next-hop node. The one or more processors may update a remaining segments value, that is included in the CRH, that identifies a number of segments left in a route of the IP payload packet. The one or more processors may provide the IP payload packet that includes the CRH to the next-hop node to allow the next-hop node to route the IP payload packet to another node in the network or to a destination device.

According to some implementations, a non-transitory computer-readable medium may store one or more instructions that, when executed by one or more processors of a node, cause the one or more processors to receive an internet protocol (IP) payload packet that has been encapsulated using a set of headers that include an IPv6 transport header. The IPv6 transport header may include a destination IP address of the node. The IPv6 transport header may have been extended with a compressed routing header (CRH) that includes a list of segment identifiers (SIDs) that identify a set of nodes that the IP payload packet is to traverse while being routed through a network. The list of SIDs may have variable lengths of: eight bits, sixteen bits, thirty-two bits, or sixty-four bits. The one or more instructions may cause the one or more processors to determine, by referencing the list of SIDs included in the CRH, a next segment for the IP payload packet. The one or more instructions may cause the one or more processors to update the destination IP address to a particular destination IP address of a next-hop node. The one or more instructions may cause the one or more processors to update a remaining segments value, that is included in the CRH, that identifies a number of segments left in a route of the IP payload packet. The one or more instructions may cause the one or more processors to provide the IP payload packet that includes the CRH to the next-hop node to allow the next-hop node to route the IP payload packet to another node in the network or to a destination device.

BRIEF DESCRIPTION OF THE DRAWINGS

FIGS. 1A-1H are diagrams of one or more example implementations described herein.

FIG. 2 is a diagram of an example compressed routing header (CRH).

DETAILED DESCRIPTION

Figure 1A:
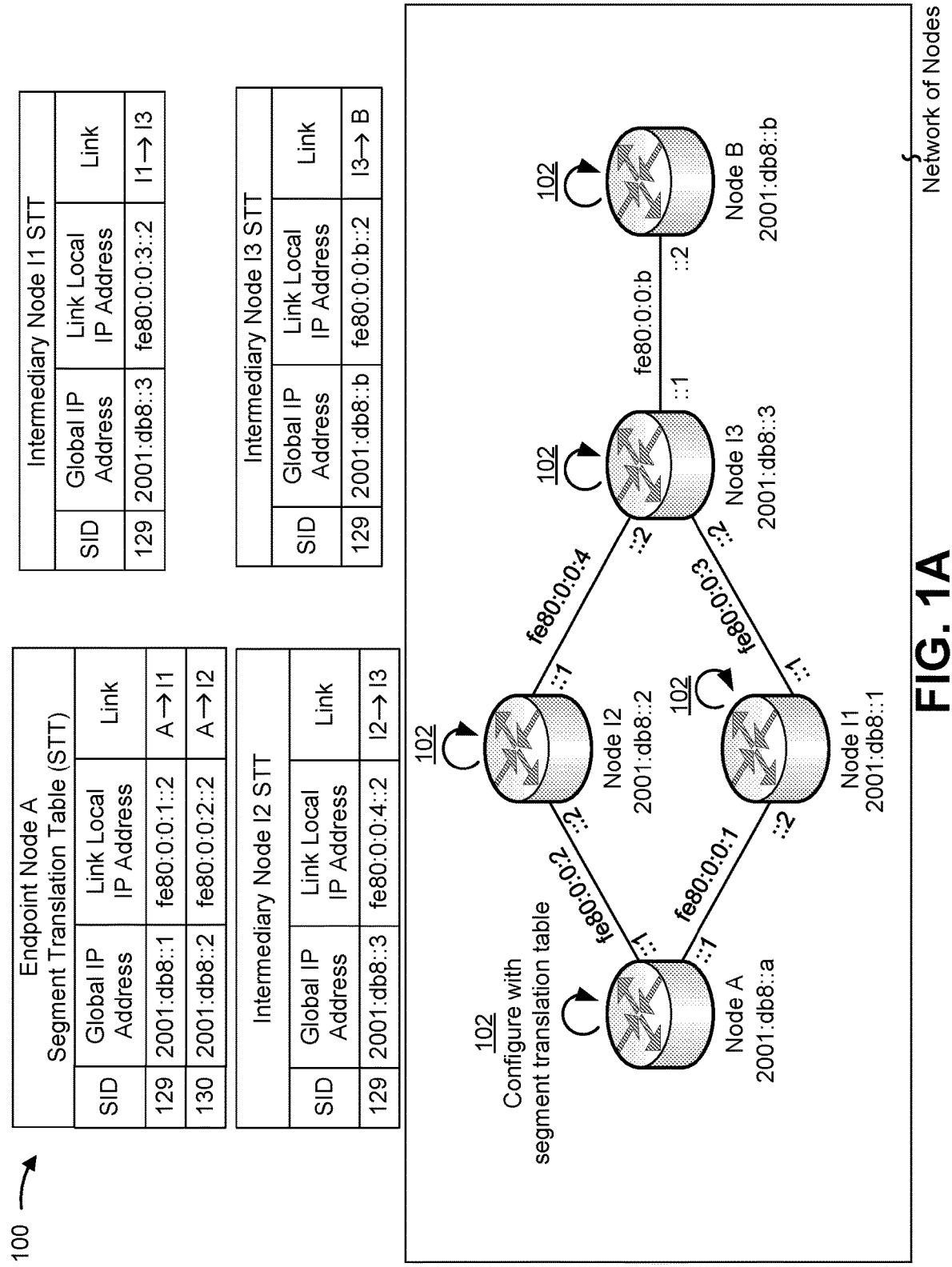

The following detailed description of example implementations refers to the accompanying drawings. The same reference numbers in different drawings may identify the same or similar elements.

A network of nodes may be used to route packets. In many cases, the packets may be routed through the network by taking a least cost path. For example, a packet may have multiple possible paths through the network, and the nodes may use a routing protocol (e.g., a Border Gateway Protocol (BGP), and/or the like) to select a least cost path through the network route.

In some situations, segment routing may be used to allow the packets to be routed using a path other than a least cost path. For example, a client using the network to route packets may want the packets to travel through a particular firewall, to avoid network congestion by taking a longer path through the network, and/or the like. To route a packet through the network using segment routing, the packet may be encapsulated using a Segment Routing Header that includes a list of IP addresses (or segment identifiers with bit-lengths as long as IP addresses) that serve as required hops that the packet is to take while being routed through the network. As an example, when a node in the network receives a packet, the node may, instead of identifying a next hop in a least cost path, process the list of IP addresses in the segment routing header to determine whether a next hop is a required hop identified in the list.

However, segment routing is often an inefficient way to route packets through a network. For example, many nodes used to route packets through the network have application-specific integrated circuits (ASICs) that copy the entire list of IP addresses from buffer memory to on-chip memory. If the list of IP addresses is long, the nodes may expend significant processing resources performing copying operations and/or significant memory resources storing the list.

Some implementations described herein provide a network of nodes that use a compressed routing header (CRH) to route an encapsulated IP payload packet through a network using a pre-defined path, where the CRH includes a list of segment identifiers (SIDs) that have variable lengths between eight bits and sixty-four bits. For example, the set of nodes may each be configured with particular segment translation tables that define one or more segments of the pre-defined path. The segment translation table may include strictly routed segments and/or loosely routed segments, as will be described further herein. In this case, when a first edge node receives an IP payload packet, the first edge node may encapsulate the IP payload packet using an IPv6 transport header that has been extended to include the CRH. Additionally, the first edge node may provide the IP payload packet to a first intermediary node in the network.

In this case, the first intermediary node may reference the list of SIDs included in the CRH to select a SID. Additionally, the first intermediary node may reference the segment translation table to identify a corresponding SID that is stored in association with an IP address and/or interface of a next-hop node for the IP payload packet. In this case, the first intermediary node may update a destination IP address (e.g., which may be included in the IPv6 transport header) to the IP address of the next-hop node. Additionally, the first intermediary node may update a remaining segments value of the CRH by decrementing the value by one.

Furthermore, the first intermediary node may provide the IP payload packet to the next-hop node (e.g., another intermediary node, an endpoint node, etc.) to allow the next-hop node to continue to route the IP payload packet. One or more additional nodes in the network may use the list of SIDs to route the IP payload packet until the IP payload packet is received by the endpoint node. When the endpoint node receives the IP payload packet, the IP payload packet may have a remaining segments value of zero. This may allow the endpoint node to process a payload header of the IP payload packet (rather than the IPv6 transport header that is extended with the CRH) to identify a final destination IP address of a final destination (e.g., a device outside of the network) and to send the IP payload packet to the final destination.

In this way, the set of nodes are able to use the CRH to route the IP payload packet through the network in a manner that uses a pre-defined path, without needing to include IP addresses for each hop in the CRH. By using smaller values in the list of SIDs (instead of a list of IP addresses), the set of nodes conserve resources (e.g., processing resources, network resources, memory resources, and/or the like) relative to other types of segment routing headers. For example, use of the CRH conserves processing resources that the set of nodes would otherwise expend performing copy operations on a longer more conventional segment routing header, conserves network resources by reducing a total length of the IP payload packet that is being transmitted over the network (relative to a conventional segment routing header), conserves memory resources by reducing an amount of memory needed to store the IP payload packet (relative to a conventional segment routing header), and/or the like.

Furthermore, some implementations described herein allow the IP payload packet to be routed through one or more strictly routed segments (defined further herein) using one or more link-local IPv6 addresses. For example, for all segments except a final segment, a node that receives the IP payload packet may update the destination IP address to a link-local IPv6 address. This improves security by reducing chances of the IP payload packet being routed off one of the strictly routed segments, as further explained elsewhere herein. Additionally, by updating the destination IP address to a global IP address on a final segment (rather than to a link-local IPv6 address), the set of nodes further improves security by providing protection against link-local address spoofing.

FIGS. 1A-1H are diagrams of one or more example implementations 100 described herein. For example, example implementation(s) 100 may include a first peer device (shown as Peer Device 1), a second peer device (shown as Peer Device 2), and a set of nodes that are part of a network, such as a first edge node (shown as Node A), a set of intermediary nodes (shown as Node I1, Node I2, and Node I3), and a second edge node (shown as Node B). As shown in FIGS. 1A-1H, the set of nodes may be configured with particular segment translation tables and may use the particular segment translation tables to route, through the network, an internet protocol (IP) payload packet that has been encapsulated using an IPv6 transport header that has been extended with a compressed routing header (CRH).

As shown in FIG. 1A, and by reference number 102, the set of nodes may be configured with a segment translation table. For example, the set of nodes may be configured with a segment translation table that assists in routing network traffic via a specific path. The segment translation table may be provided to the set of nodes via a network controller, via a distributed routing protocol, and/or via another device or technique. The segment translation table may include values that define one or more segments of a path that an IP payload packet could take through the network. For example, the segment translation table may include one or more strictly routed segments, one or more loosely routed segments, and/or a combination of strictly and loosely routed segments. A loosely routed segment may be defined as a path from a node to a terminal interface, where the node and the terminal interface are connected via one or more other nodes and/or links. A strictly routed segment may be defined as a path from a node to a terminal interface, where there is exactly one link from the node to the terminal interface.

In some implementations, a node may be configured with a segment translation table that includes a set of strictly routed segments. The segment translation table may include, for each strictly routed segment, a SID that is unique to the node, two IP addresses (e.g., a global IP address, a link-local IPv6 address, etc.) that can be used to identify an interface at which the strictly routed segment terminates (i.e., a terminal interface), and one link that connects the node to the terminal interface. The SID may be represented by a value that is less expensive for nodes to copy than an IP address (e.g., an eight-bit value, a sixteen-bit value, etc.). The interface at which a strictly routed segment terminates is the global IP address (e.g., a globally-scoped IP address, a unique local address (ULA), etc.) or the link-local IPv6 address. The link-local IPv6 address may be used when sending IP payload packets to intermediary nodes and the global IP address may be used when sending IP payload packets to an edge node (e.g., an egress node).

As shown as an example, the set of network nodes may be configured with a segment translation table that includes one or more strictly routed segments. In this example, the first edge node (Node A) may be configured with a segment translation table with two strictly routed segments. The first strictly routed segment may include a SID of 129, a global IP address of 2001:db8::1 a link-local IPv6 address of fe80:0:0:1::2, and an interface from the first edge node to the first intermediary node (shown as A→I1). The second strictly routed segment may include a SID of 130, a global IP address of 2001:db8::1, a link-local IPv6 address of fe80:0:0:2::2, and an interface from the first edge node to the second intermediary node (shown as A→I2). In some cases, an ingress node (e.g., the first edge node) may include a master list of segments for the entire route of the IP payload packet (e.g., which are shown in FIG. 1A as being part of segment translation tables for other nodes).

Additionally, or alternatively, a node may be configured with a segment translation table that includes a set of loosely routed segments. The segment translation table may include, for each loosely routed segment, a SID, an IP address that can be used to identify a terminal interface, and one or more nodes and/or links that connect the origin node and the terminal interface. The IP address is a global IP addresses (e.g., a globally scoped address, a ULA, etc.). Furthermore, the segment translation table that includes loosely routed segments may be configured to each of the set of nodes.

In this way, the set of nodes may be configured with a segment translation table that may be used to route IP payload packets through the network.

Figure 1B:
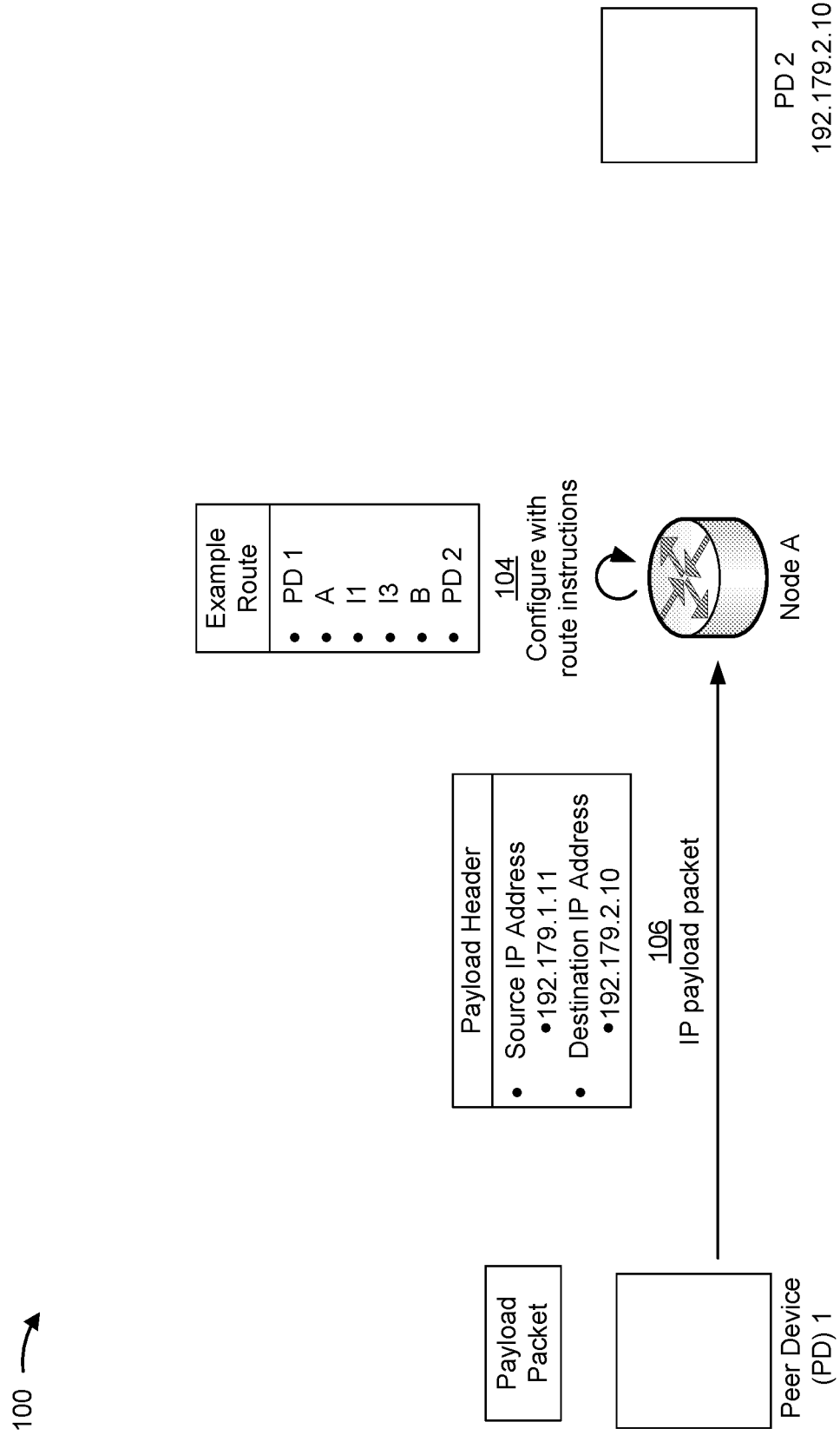

As shown in FIG. 1B, and by reference number 104, the first edge node may be configured with route instructions. For example, the first edge node may be configured with route instructions that specify a particular path that certain IP payload packets are to take through the network, that identify one or more required hops that certain IP payload packets are to take through the network, and/or the like. In this case, the first edge node may be configured with route instructions that have been provided by a network controller, by a device associated with a network administrator, by a device of a client that has explicitly requested that certain IP payload packets be subject to the route instructions, and/or the like. The route instructions may be applicable to all IP payload packets, to a specific type of IP payload packets, to IP payload packets with a particular source IP address and/or destination IP address, and/or the like.

As an example, the route instructions may indicate that payload packets with a source IP address of the first peer device and/or with a destination IP address of the second peer device are to be routed from the first peer device (Peer Device 1) to the first edge node (Node A), from the first edge node to the first intermediary node (Node I1), from the first intermediary node to the third intermediary node (Node I3), from the third intermediary node to the second edge node (Node B), and from the second edge node to the second peer device (Peer Device 2).

As shown by reference number 106, the first peer device may provide an IP payload packet to the first edge node. For example, the first peer device may encapsulate an IP payload packet with a payload header (e.g., an IPv4 payload header, an IPv6 payload header, an ethernet payload header, etc.). The payload header may be an IPv4 payload header, an IPv6 payload header, an ethernet payload header, or the like. The payload header may include a source IP address of the first peer device (shown as 192.179.1.11) and a destination IP address of the second peer device (shown as 192.179.2.10).

In this way, the first edge node is able to receive IP an IP payload packet from the first peer device.

Figure 1C:
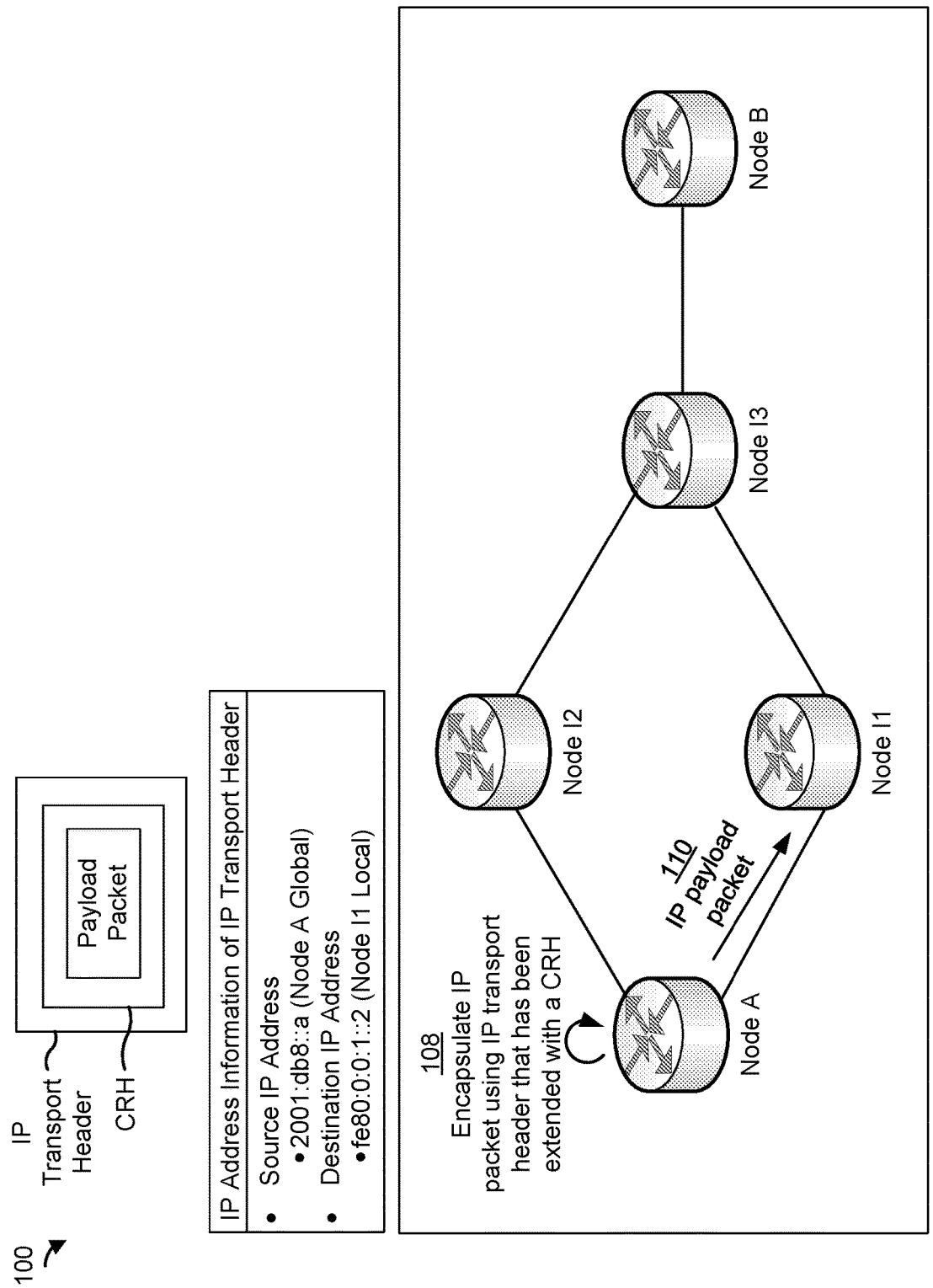

As shown in FIG. 1C, and by reference number 108, the first edge node may encapsulate the IP payload packet using an IPv6 transport header that has been extended using a compressed routing header (CRH). For example, the first edge node may reference the segment translation table and/or the route instructions to determine that the IP payload packet is to be encapsulated using an IPv6 transport header that has been extended with a CRH. As an example, the route instructions may indicate that IP payload packets with a particular source IP address or destination IP address are to be encapsulated with an IPv6 transport header that is extended with a CRH.

The CRH may include a list of SIDs that define the path for the IP payload packet, a total segments value, a remaining segments value, a compression value, a next header value, a header extension length, a routing type, and a reserved value. The list of SIDs may include a list of node-specific values that correspond to a list of SIDs included in the segment translation table. The total segments value may identify a maximum number of segments needed for the IP payload packet to reach a final-hop node (e.g., the second edge device). The remaining segments value may identify a number of remaining segments between an origin node (e.g., the node that receives the IP payload packet) and the second edge node. A description of the remaining values of the CRH may be found below in relation to FIG. 2.

In some implementations, before determining which values to include in the CRH, the first edge node may update the source IP address and the destination IP address included in the IPv6 transport header. For example, the first edge node may update the source IP address with the global IP address of the first edge node and may update the destination IP address with the link-local IPv6 address of the next-hop node (which may be found in the segment translation table).

In some implementations, the first edge node may select which values to include in the CRH. For example, the first edge node may select, as values for the list of SIDs, the values that are identified in the segment translation table. Additionally, the first edge node may determine a total segments value based on a number of entries in the list of SIDs. One or more additional values in the CRH may be selected or generated in a manner described elsewhere herein.

In some implementations, the first edge node may encapsulate the IP payload packet using the IPv6 transport header that has been extended with the CRH. For example, the first edge node may encapsulate the IP payload packet such that the IPv6 transport header is an outer-most header of the IP payload packet. Between the IP payload packet and the IPv6 transport header may be a set of extension headers (e.g., a hop-by-hop extension header, a routing extension header, a destination header, etc.) which are not part of the processes described herein.

As shown by reference number 110, the first edge node may provide the IP payload packet that has been encapsulated to the first intermediary node. In this way, the first edge node is able to encapsulate the IP payload packet using the IPv6 transport header that has been extended with the CRH and is able to use values included in the CRH to route the IP payload packet to the next-hop in the network.

Figure 1D:
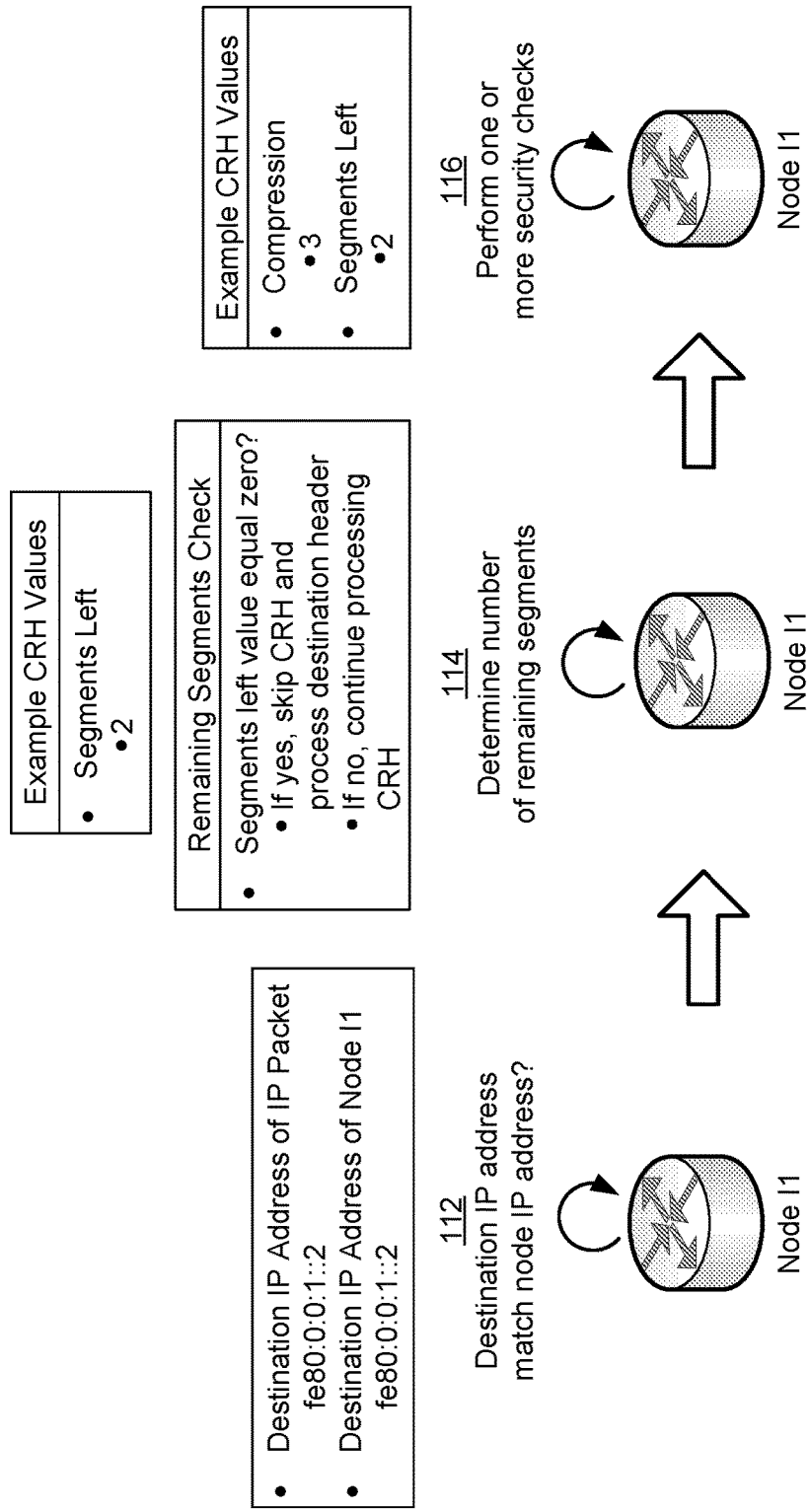

As shown in FIG. 1D, the first intermediary node may perform one or more header pre-processing checks and/or one or more security checks on the IP payload packet. For example, and as shown by reference number 112, the first intermediary node may determine whether the destination IP address that is included in the IPv6 transport header matches an IP address of the first intermediary node. This is because the set of nodes are configured to process, update, and/or modify the CRH only if the destination IP address that is included in the IPv6 transport header matches an IP address of a node. In this example, the first intermediary node may determine that the destination IP address matches the IP address of the first intermediary node (e.g., the IPv6 transport header is shown as having a destination IP address of fe80:0:0:1::2, which is the link-local IPv6 address of the first intermediary node).

As shown by reference number 114, the first intermediary node may determine a number of remaining segments in a path of the IP payload packet. For example, the first intermediary node may process the remaining segments value of the CRH to determine the number of remaining segments in the path. If the remaining segments value is greater than zero, then the first intermediary node may continue processing the CRH. If the remaining segments value is zero, then the first intermediary node may stop processing the CRH and process a next header of the IP payload packet (e.g., one of the extension headers, the payload header, etc.). In practice, the remaining segments value will be zero only when a final node in the network is receiving the IP payload packet. This provides the final node with a way to identify when the IP payload packet has reached a final hop in the network and may cause the final node to forgo processing of the CRH and to route the IP payload packet to a device outside of the network, as will be described further herein.

As shown by reference number 116, the first intermediary node may perform one or more security checks. For example, the first intermediary node may determine whether the source IP address included in the IPv6 transport header is a link-local IPv6 address, may determine whether the source IP address or destination IP address included in the IPv6 transport header is a multicast address, may determine whether a hop limit has been exceeded, may determine whether the IP payload packet is malformed, and/or the like. To provide an example, assume an IP payload packet is encapsulated using an IPv6 transport header that has been extended with a CRH that is sixteen bytes long and that includes a total segments value of sixty-four (where each segment is one byte). In this example, sixty-four one-byte segments would not fit into a sixteen byte CRH, which means the payload packet has been malformed. In this case, the first intermediary node would identify that the payload packet is malformed and would discard the payload packet.

In this way, the first intermediary node performs one or more header pre-processing checks and/or one or more security checks on the IP payload packet (e.g., on one or more headers of the IP payload packet).

As shown in FIG. 1E, and by reference number 118, the first intermediary node may determine a next segment for the IP payload packet. For example, the first intermediary node may determine an index i for the next segment by subtracting a remaining segments value from a total segments value. In the example shown, the total segments value indicates that there are two total segments and the remaining segments value indicates that there are two segments left. By subtracting the remaining segments value from the total segments value, the first intermediary node may determine that the index i has a value of zero.

Additionally, the first intermediary node may identify a SID number at index position i in the list of SIDs. In the example shown, the SID value at segment[0] is 129. Furthermore, this allows the first intermediary node to determine the next segment by searching the segment translation table for a corresponding SID that may be stored in association with a global IP address of a next-hop node, a link-local IPv6 address of a next-hop node, and a link identifier of a link to the next-hop node.

As shown by reference number 120, the first intermediary node may update the destination IP address of the IP payload packet and the remaining segments value. For example, the first intermediary node may translate the destination IP address with a global IP address or a link-local IPv6 address of the next-hop node. In this case, the first intermediary node may translate the destination IP address with the global IP address if the remaining segments value is one (or another value that indicates that a next segment is a final segment) or may replace the destination IP address with the link-local IPv6 address if the remaining segments value is greater than one (or another value that indicates that the next segment is not the final segment). In some cases, the first intermediary node may translate an eight-bit, sixteen-bit, thirty-two-bit, or sixty-four-bit segment identifier, to a one hundred and twenty-eight-bit IPv6 address.

By updating the destination IP address included in the IPv6 transport header with the global IP address at a penultimate node, the penultimate node ensures that the IP payload packet will never have a link-local address when routed to a final destination (e.g., the second peer device). This protects from various classes of attacks in which an off-link attacker may attempt to assume on-link status by using a link-local address. By replacing the destination IP address included in the IPv6 transport header with the link-local IPv6 address, a node that performs the update protects against certain classes of mis-programming. For example, between a time that the IP payload packet was sent and a time that the IP payload packet arrived at the first intermediary node, the first intermediary node may have received instructions to update the segment translation table. In this case, the first intermediary node might, based on the updated segment translation table, mistakenly send the IP payload packet to a neighboring node that is not part of the strictly routed path of the IP payload packet. However, because the destination IP address will be updated to a link-link-local IPv6 address, the neighboring node that was not supposed to receive the IP payload packet would drop the IP payload packet. This is because nodes that are not part of the strictly routed path may be configured to drop IP payload packets that have a link-local IPv6 source or destination IP address.

In some implementations, the first intermediary node may update the remaining segments value. For example, the first intermediary node may decrement the remaining segments value by one. In the example shown, the first intermediary node may decrement the remaining segments value from a value of two to a value of one.

In this way, the first intermediary node is able to use the CRH to determine the next segment for the IP payload packet and is able to update one or more values of the IP payload packet that allow subsequent nodes to continue to route the IP payload packet.

Figure 1F:
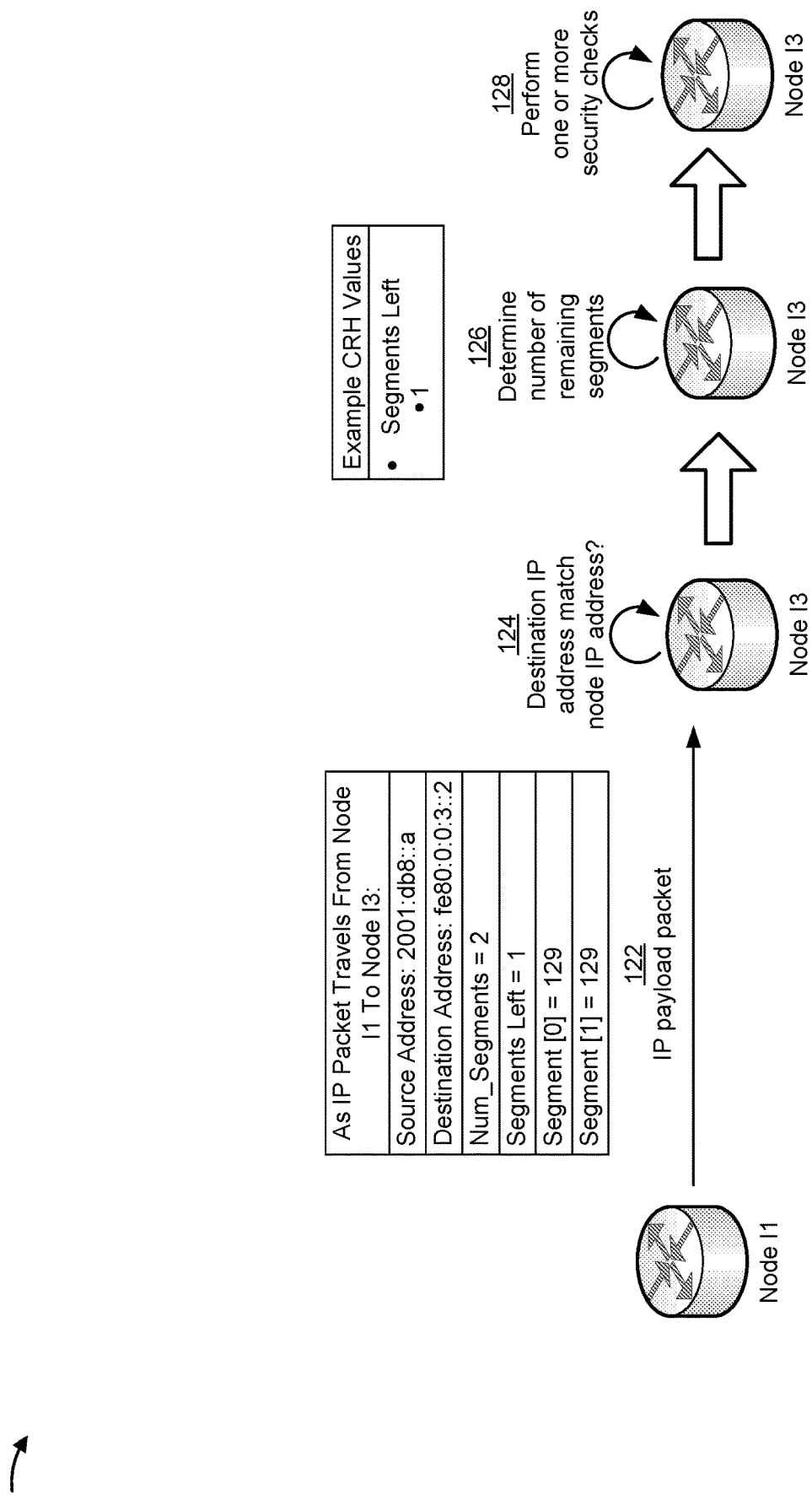

As shown in FIG. 1F, and by reference number 122, the first intermediary node may provide the IP payload packet that has been encapsulated to the third intermediary node. The IPv6 transport header of the IP payload packet may include a source IP address of the first endpoint node and a destination IP address that is a link-local IPv6 address of the third intermediary node.

As shown by reference number 124, the third intermediary node may determine whether the destination IP address included in the IPv6 transport header matches an IP address of the third intermediary node, in a manner described elsewhere herein. As shown by reference number 126, the third intermediary node may determine a number of remaining segments in the path of the IP payload packet, in a manner described elsewhere herein. In the example shown, the third intermediary node may determine that there is one remaining segment, which may cause the third intermediary node to continue processing the CRH. As shown by reference number 128, the third intermediary node may perform one or more security checks, in a manner described elsewhere herein.

In this way, the third intermediary node is able to perform the one or more header pre-processing checks and/or the one or more security checks on the IP payload packet.

Figure 1G:
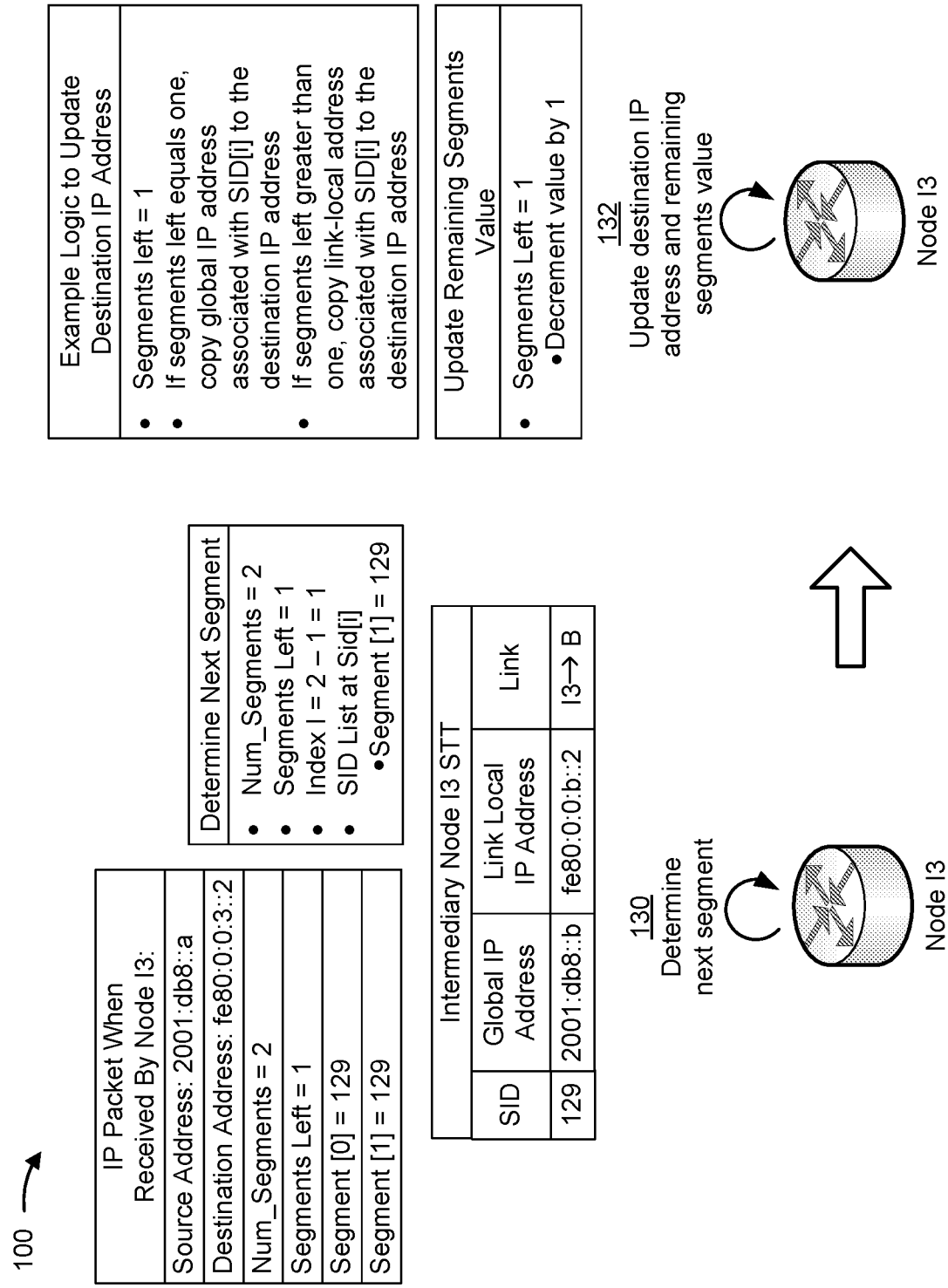

As shown in FIG. 1G, and by reference number 130, the third intermediary node may determine a next segment. For example, the third intermediary node may determine the next segment in a manner described elsewhere herein.

In the example shown, the total segments value indicates that there are two total segments and the remaining segments value indicates that there is one remaining segment. By subtracting the remaining segments value from the total segments value, the third intermediary node may determine that the index i has a value of one. Additionally, the third intermediary node may process the list of SIDs to identify that a SID at index position 1 has a value of 129. This may allow the third intermediary node to determine the next segment by searching the segment translation table for a corresponding SID value of 129, which is stored in association with a global IP address of 2001:db8::3, a link-local IPv6 address of fe80:0:0:b::2, and a link identifier of a link from the third intermediary node to the second edge node.

As shown by reference number 132, the third intermediary node may update the destination IP address of the IP payload packet and the remaining segments value included in the CRH. For example, the third intermediary node may replace the destination IP address included in the IPv6 transport header with a global IP address or a link-local IPv6 address of a next-hop node. In this case, the third intermediary node may determine that the remaining segments value is one, and, based on determining that the remaining segments value is one, may update the destination IP address included in the IPv6 transport header with the global IP address of the next-hop node. In the example shown, the third intermediary node may update the destination IP address from a value of fe80:0:0:3::2 to a value of 2001:db8::b.

Additionally, the third intermediary node may decrement the remaining segments value by one. In the example shown, the third intermediary node may decrement the remaining segments value from a value of one to a value of zero.

In this way, the third intermediary node is able to determine the next segment for the IP payload packet and is able to update one or more values of the IP payload packet to allow subsequent nodes to continue to route the IP payload packet.

Figure 1H:
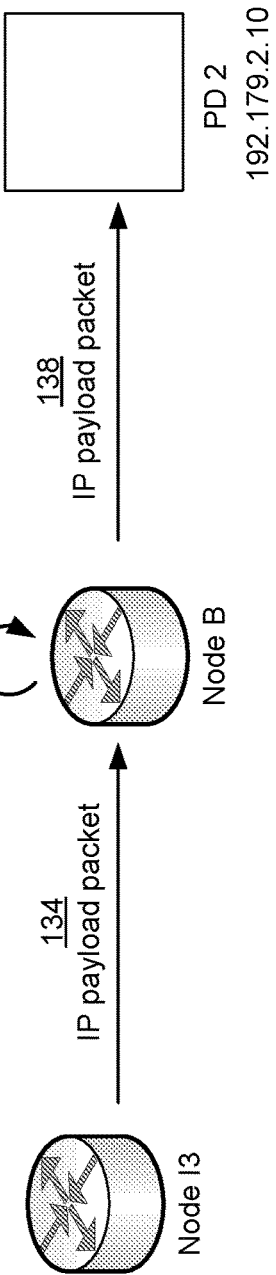

As shown in FIG. 1H, and by reference number 134, the third intermediary node may provide the IP payload packet that has been encapsulated to the second edge node (Node B). The IP payload packet may include a source IP address of the first edge node (2001:db8::a) and a destination IP address of the second edge node (2001:db8::b). In some implementations, the second edge node may perform one or more header pre-processing checks, in a manner described elsewhere herein.

As shown by reference number 136, the second edge node may determine a next-hop for the IP payload packet based on the number of remaining segments. For example, the second edge node may process the CRH to determine that the remaining segments value is equal to zero.

In some implementations, because the remaining segments value is zero, the second edge node may forgo additional processing of the CRH and may process one more other headers of the IP payload packet (e.g., the payload header, etc.). In the example shown, the payload header may include a destination IP address for the second peer device (192.172.1.10), which may allow the second edge device to route the IP payload packet to the second peer device.

In some implementations, the second edge node may determine a next-hop by referencing a segment translation table. While not shown, the second edge node may be configured with a segment translation table that has the destination IP address of the second peer device stored as part of the translation table (e.g., in place of the global IP address, and with a null value for a link-link-local IPv6 address), and may reference the segment translation table to identify the destination IP address of the second peer device.

In this way, the set of nodes are able to use the CRH to route the IP payload packet through the network in a manner that uses a strictly defined path, without needing to include IP addresses for each hop in the strictly defined path in the segment list. This conserves resources (e.g., processing resources, network resources, memory resources, and/or the like) relative to other types of segment routing headers that would expend a significant amount of resources performing copy operations on a longer more conventional segment routing header.

As indicated above, FIGS. 1A-1H are provided by way of example. Other examples may differ from what is described with regard to FIGS. 1A-1H. For example, there may be additional devices and/or networks, fewer devices and/or networks, different devices and/or networks, or differently arranged devices and/or networks than those shown in FIGS. 1A-1H. Furthermore, two or more devices shown in FIGS. 1A-1H may be implemented within a single device, or a single device shown in FIGS. 1A-1H may be implemented as multiple and/or distributed devices. Additionally, or alternatively, a set of devices (e.g., one or more devices) of example implementation(s) 100 may perform one or more functions described as being performed by another set of devices of example implementation(s) 100.

FIG. 2 is a diagram of an example compressed routing header (CRH) 200. As shown in FIG. 2, CRH 200 may include a next header field, a header extension length field, a routing type field, a remaining segments field (shown as Segments Left), a total segments field (shown as Num Segments), a reserved field, a compression field, and a list of segment identifiers (SIDs) field. The next header field may include an eight-bit selector value that identifies a type of header immediately following an internet protocol (IP) header (e.g., an IPv6 header). The header extension length field may include an eight-bit unsigned integer value that identifies a length of a hop-by-hop options header in eight-octet units, but that excludes the first eight octets.

The routing type field may include an eight-bit identifier value for a particular routing header variant, as may be defined by the internet assigned numbers authority (IANA). The remaining segments field may include a value that identifies a number of remaining segments between an origin node (e.g., a node that receives an IP payload packet) and a final-hop node (e.g., a node that is part of a final segment in a path). The total segments field may include a value that identifies a maximum number of segments needed for an IP payload packet to reach the final-hop node. This value may be defined by a number of entries in the list of SIDs. The reserved field may include a value set to zero by a sender node and ignored by a receiver node.

The compression field may include a two-bit value that may be checked to determine whether an IP payload packet is malformed. For example, the compression field may include a value that a node may process to determine a minimum CRH length, which may allow the node to determine whether the IP payload packet is malformed. The minimum CRH length is measured in eight-octet units that exclude the first eight octets. The compression field may include a value of zero, one, two, or three. The value of zero may correspond to an eight-bit encoding, the value of one may correspond to a sixteen-bit encoding, the value of two may correspond to a thirty-two-bit encoding, and the value of three may correspond to a sixty-four-bit encoding. Additionally, if the compression value is set to a value of two or a value of three, the list of SIDs begins on a thirty-two-bit boundary. In those cases, the reserved field may be extended. In all cases, the CRH ends on a sixty-four-bit boundary. Therefore, the CRH may be padded with zeroes.

As an example, to compute the minimum CRH length, a node may provide a compression value and a total number of segments value as input to an algorithm that computes the minimum CRH length. To provide example pseudocode, the node might execute the following: If (compression value==0), set a value x equal to a total segments value minus two, set the compression value equal to x divided by eight, and, if x divided by eight has a remainder, increment the compression value by one. If (compression value==1), set x equal to a total segments value minus one, set the compression value equal to x divided by four, and, if x divided by four has a remainder, increment the compression value by one. If (compression value==2), set x equal to the total number of segments, set the compression value equal to x divided by two, and, if x divided by two has a remainder, increment the compression value by one. If (compression value==3), set the compression value equal to the total segments value.

The list of SIDs field may include a set of SID values that represent segments in the list of segments. In some implementations, such as when the list of segments includes loosely routed segments, each SID may include a unique value. In some implementations, such as when the list of segments includes strictly routed segments, each SID may be unique to a node, such that the same SID value could be used on multiple nodes.

As indicated above, FIG. 2 is provided by way of example. Other examples may differ from what is described with regard to FIG. 2. For example, there may be additional fields and/or values, fewer fields and/or values, different fields and/or values, or differently arranged fields and/or values than those shown in FIG. 2.

Figure 3:
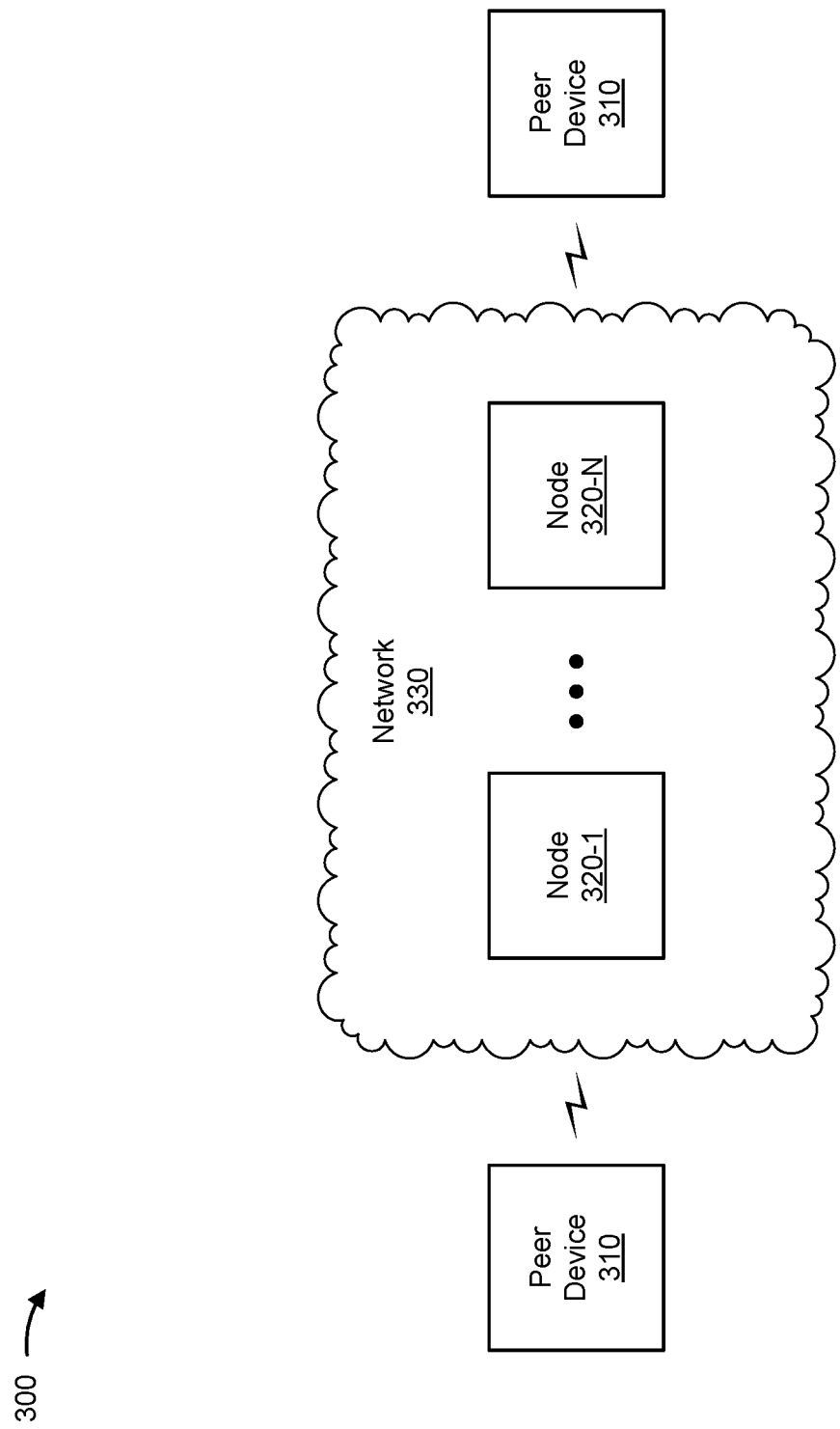
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more peer devices 310, a group of nodes 320 (shown as node 320-1 through node 320-N), and a network 330. Devices of environment 300 may interconnect via wired connections, wireless connections, or a combination of wired and wireless connections.

Peer device 310 includes one or more devices capable of receiving and/or providing network traffic. For example, peer device 310 may include a traffic transfer device, such as a router, a gateway, a switch, a firewall, a hub, a bridge, a reverse proxy, a server (e.g., a proxy server, a server executing a virtual machine, etc.), a security device, an intrusion detection device, a load balancer, or a similar type of device. In some implementations, peer device 310 may include an endpoint device that is a source or a destination for network traffic. For example, peer device 310 may include a computer or a similar type of device. Peer device 310 may receive network traffic from and/or may provide network traffic (e.g., payload packets) to other peer devices 310 via network 330 (e.g., by routing payload packets using node(s) 320 as an intermediary). In some implementations, peer device 310 may include an edge device that is located at an edge of one or more networks. For example, peer device 310 receive network traffic from and/or may provide network traffic (e.g., payload packets) to devices external to network 330.

Node 320 includes one or more devices capable of receiving, processing, storing, routing, and/or providing traffic (e.g., a payload packet, a file, etc.) in a manner described herein. For example, node 320 may include a router, such as a label switching router (LSR), a label edge router (LER), an ingress router, an egress router, a provider router (e.g., a provider edge router, a provider core router, etc.), a virtual router, and/or the like. Additionally, or alternatively, node 320 may include a gateway, a switch, a firewall, a hub, a bridge, a reverse proxy, a server (e.g., a proxy server, a cloud server, a data center server, etc.), a load balancer, and/or a similar device.

In some implementations, node 320 may be a physical device implemented within a housing, such as a chassis. In some implementations, node 320 may be a virtual device implemented by one or more computer devices of a cloud computing environment or a data center.

In some implementations, node 320 may be configured with one or more segment translation tables. In some implementations, node 320 may receive a payload packet from peer device 310. In some implementations, node 320 may encapsulate the payload packet using a compressed routing header (CRH) and may route the IP payload packet to another node 320, using one or more techniques described elsewhere herein. In some implementations, node 320 may be an edge node in network 330. In some implementations, node 320 may be an intermediary node in network 330 (i.e., a node between two or more edge nodes).

Network 330 includes one or more wired and/or wireless networks. For example, network 330 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices)

of environment 300 may perform one or more functions described as being performed by another set of devices of environment 300.

Figure 4:
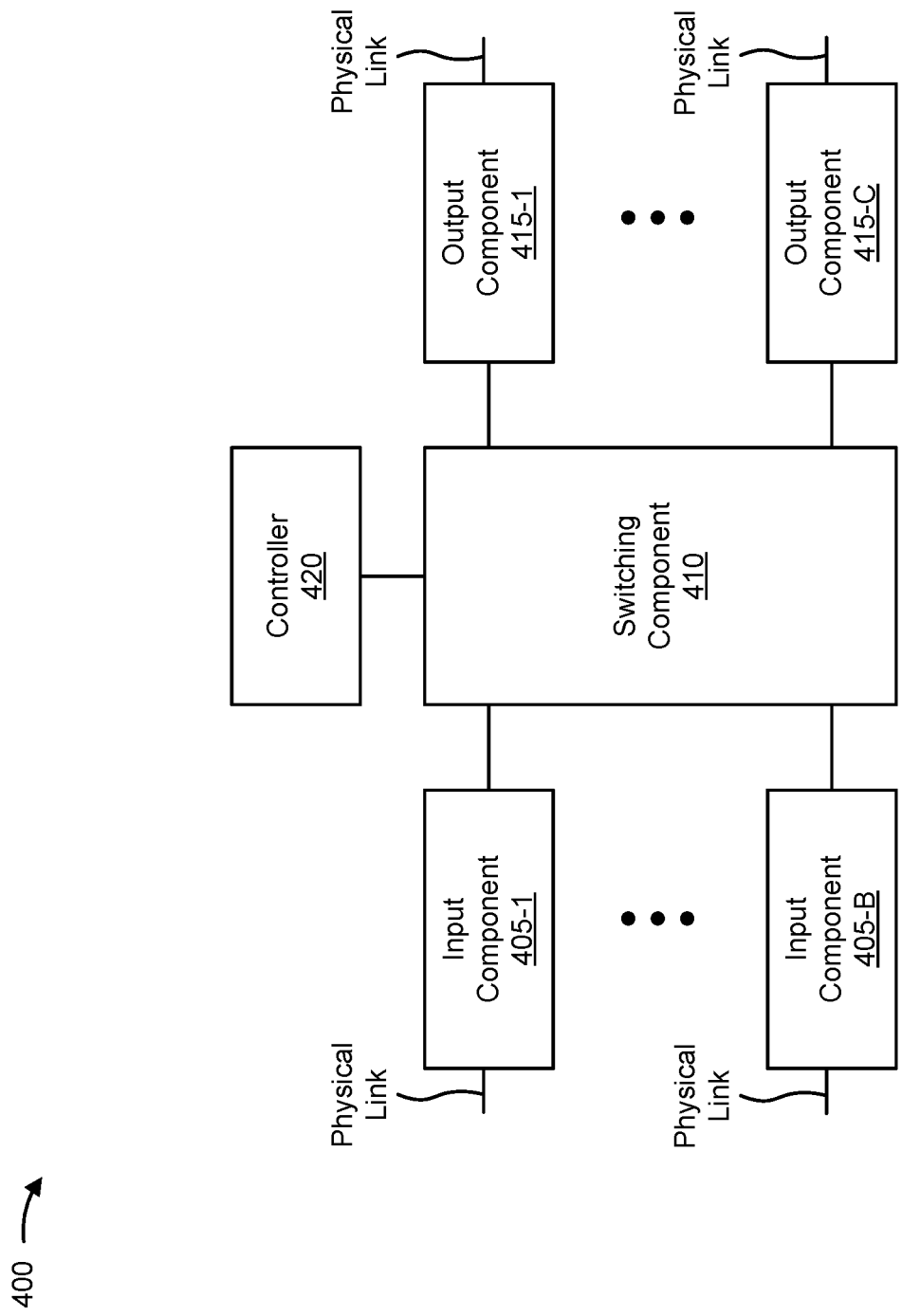
FIG. 4 is a diagram of example components of one or more devices of FIG. 3.

FIG. 4 is a diagram of example components of a device 400. Device 400 may correspond to peer device 310 and/or node 320. In some implementations, peer device 310 and/or node 320 may include one or more devices 400 and/or one or more components of device 400. As shown in FIG. 4, device 400 may include one or more input components 405-1 through 405-B (B≥1) (hereinafter referred to collectively as input components 405, and individually as input component 405), a switching component 410, one or more output components 415-1 through 415-C(C≥1) (hereinafter referred to collectively as output components 415, and individually as output component 415), and a controller 420.

Input component 405 may be points of attachment for physical links and may be points of entry for incoming traffic, such as payload packets. Input component 405 may process incoming traffic, such as by performing data link layer encapsulation or decapsulation. In some implementations, input component 405 may send and/or receive payload packets. In some implementations, input component 405 may include an input line card that includes one or more payload packet processing components (e.g., in the form of integrated circuits), such as one or more interface cards (IFCs), payload packet forwarding components, line card controller components, input ports, processors, memories, and/or input queues. In some implementations, device 400 may include one or more input components 405.

Switching component 410 may interconnect input components 405 with output components 415. In some implementations, switching component 410 may be implemented via one or more crossbars, via busses, and/or with shared memories. The shared memories may act as temporary buffers to store payload packets from input components 405 before the payload packets are eventually scheduled for delivery to output components 415. In some implementations, switching component 410 may enable input components 405, output components 415, and/or controller 420 to communicate.

Output component 415 may store payload packets and may schedule payload packets for transmission on output physical links. Output component 415 may support data link layer encapsulation or decapsulation, and/or a variety of higher-level protocols. In some implementations, output component 415 may send payload packets and/or receive payload packets. In some implementations, output component 415 may include an output line card that includes one or more payload packet processing components (e.g., in the form of integrated circuits), such as one or more IFCs, payload packet forwarding components, line card controller components, output ports, processors, memories, and/or output queues. In some implementations, device 400 may include one or more output components 415. In some implementations, input component 405 and output component 415 may be implemented by the same set of components (e.g., and input/output component may be a combination of input component 405 and output component 415).

Controller 420 includes a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, or a combination of software and hardware. In some implementations, controller 420 may include one or more processors that can be programmed to perform a function.

In some implementations, controller 420 may include a random access memory (RAM), a read only memory (ROM), and/or another type of dynamic or static storage device (e.g., a flash memory, a magnetic memory, an optical memory, etc.) that stores information and/or instructions for use by controller 420.

In some implementations, controller 420 may communicate with other devices, networks, and/or systems connected to device 400 to exchange information regarding network topology. Controller 420 may create translation tables based on the network topology information, create forwarding tables based on the translation tables, and forward the forwarding tables to input components 405 and/or output components 415. Input components 405 and/or output components 415 may use the forwarding tables to perform route lookups for incoming and/or outgoing payload packets. In some cases, controller 420 may create a session table based on information determined while initializing a link fault detection (e.g., BFD) session, and may forward the session table to input components 405 and/or output components 415.

Controller 420 may perform one or more processes described herein. Controller 420 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 420 from another computer-readable medium or from another device via a communication interface. When executed, software instructions stored in a memory and/or storage component associated with controller 420 may cause controller 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
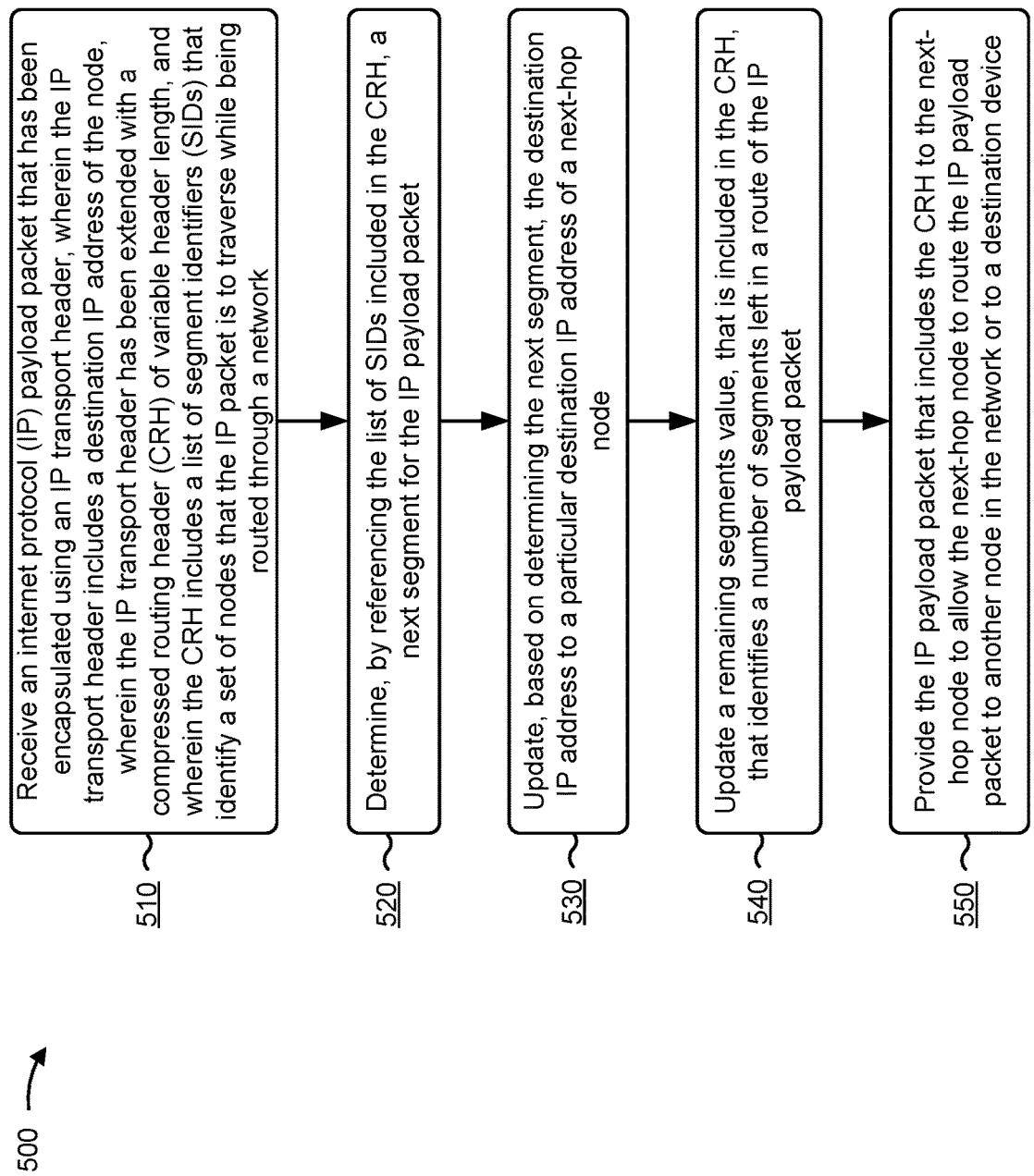
FIGS. 5-7 are flow charts of an example process for routing a payload packet through a network using a transport header that has been extended with a compressed routing header (CRH).

FIG. 5 is a flow chart of an example process 500 for routing a payload packet through a network using a transport header that has been extended with a compressed routing header (CRH). In some implementations, one or more process blocks of FIG. 5 may be performed by a node (e.g., node 320). In some implementations, one or more process blocks of FIG. 5 may be performed by another device or a group of devices separate from or including the node, such as a peer device (e.g., peer device 310).

As shown in FIG. 5, process 500 may include receiving an internet protocol (IP) payload packet that has been encapsulated using an IPv6 transport header, wherein the IPv6 transport header includes a destination IP address of the node, wherein the IPv6 transport header has been extended with a compressed routing header (CRH) of variable length, and wherein the CRH includes a list of segment identifiers (SIDs) that identify a set of nodes that the IP payload packet is to traverse while being routed through a network (block 510). For example, the node (e.g., using input component 405, switching component 410, controller 420, and/or the like) may receive an internet protocol (IP) payload packet that has been encapsulated using an IPv6 transport header, as described above. In some implementations, the IPv6 transport header may include a destination IP address of the node. In some implementations, the IPv6 transport header may have been extended with a compressed routing header (CRH) of variable length. In some implementations, the CRH may include a list of segment identifiers (SIDs) that identify a set of nodes that the IP payload packet is to traverse while being routed through a network.

As further shown in FIG. 5, process 500 may include determining, by referencing the list of SIDs included in the CRH, a next segment for the IP payload packet (block 520). For example, the node (e.g., using controller 420) may determine, by referencing the list of SIDs included in the CRH, a next segment for the IP payload packet, as described above.

As further shown in FIG. 5, process 500 may include updating, based on determining the next segment, the destination IP address to a particular destination IP address of a next-hop node (block 530). For example, the node (e.g., using controller 420) may update, based on determining the next segment, the destination IP address to a particular destination IP address of a next-hop node, as described above.

As further shown in FIG. 5, process 500 may include updating a remaining segments value, that is included in the CRH, that identifies a number of segments left in a route of the IP payload packet (block 540). For example, the node (e.g., using controller 420) may update a remaining segments value, that is included in the CRH, that identifies a number of segments left in a route of the IP payload packet, as described above.

As further shown in FIG. 5, process 500 may include providing the IP payload packet that includes the CRH to the next-hop node to allow the next-hop node to route the IP payload packet to another node in the network or to a destination device (block 550). For example, the node (e.g., using switching component 410, output component 415, controller 420, and/or the like) may provide the IP payload packet that includes the CRH to the next-hop node to allow the next-hop node to route the IP payload packet to another node in the network or to a destination device, as described above.

Process 500 may include additional implementations, such as any single implementation or any combination of implementations described below and/or in connection with one or more other processes described elsewhere herein.

In some implementations, list of SIDs may have variable lengths of: eight bits, sixteen bits, thirty-two bits, or sixty-four bits. In some implementations, a set of segments in the route of the IP payload packet may include at least one of: a strictly routed segment, or a loosely routed segment. In some implementations, a final segment in the route of the IP payload packet may be a strictly routed segment. In some implementations, the node may configure a segment translation table that associates two or more of: a set of SIDs that correspond to the list of SIDs, a set of global IP addresses, a set of link-local IPv6 addresses, or a set of interface mappings.

In some implementations, when determining the next segment for the IP payload packet, the node may identify a SID, of the list of SIDs included in the CRH, that is associated with the node, and may determine the next segment by using the SID to reference a segment translation table that maps the SID to a global IP address of the next-hop node and to a link-local IPv6 address that identifies an interface of the next-hop node, and, when updating the destination IP address, the node may update the destination IP address with the global IP address or the link-local IPv6 address based on whether the next segment is a final segment.

In some implementations, when updating the destination IP address, the node may update, based on the next segment being a final segment of the route, the destination IP address to a global IP address, where the destination IP address is updated to the global IP address and not to a link-local IPv6 address based on the next segment being the final segment of the route.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
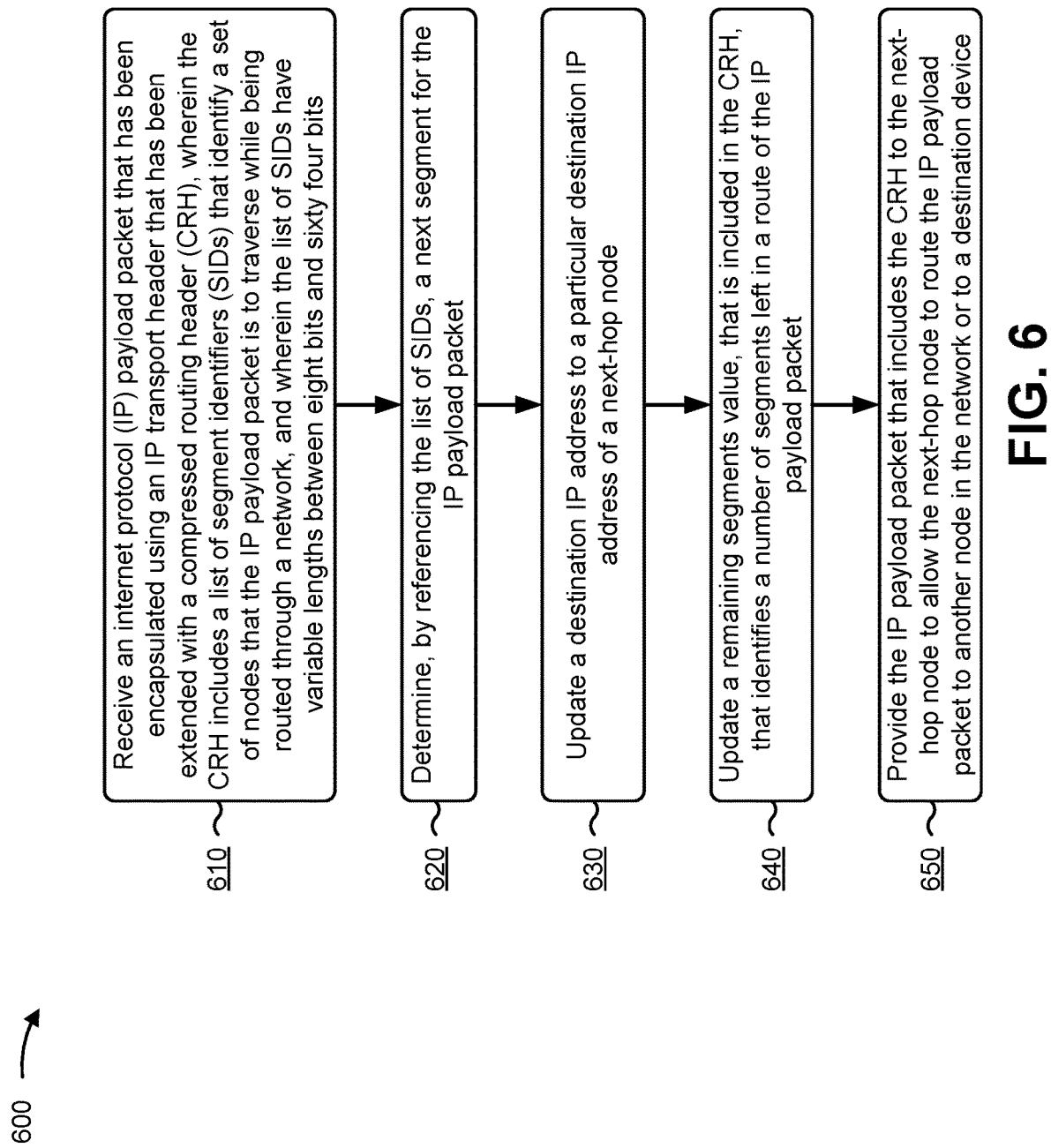

FIG. 6 is a flow chart of an example process 600 for routing a payload packet through a network using a transport header that has been extended with a compressed routing header (CRH). In some implementations, one or more process blocks of FIG. 6 may be performed by a node (e.g., node 320). In some implementations, one or more process blocks of FIG. 6 may be performed by another device or a group of devices separate from or including the node, such as a peer device (e.g., peer device 310).

As shown in FIG. 6, process 600 may include receiving an internet protocol (IP) payload packet that has been encapsulated using an IPv6 transport header that has been extended with a compressed routing header (CRH), wherein the CRH includes a list of segment identifiers (SIDs) that identify a set of nodes that the IP payload packet is to traverse while being routed through a network, and wherein the list of SIDs have variable lengths between eight bits and sixty-four bits (block 610). For example, the node (e.g., using input component 405, switching component 410, controller 420, and/or the like) may receive an internet protocol (IP) payload packet that includes a set of headers, as described above.

As further shown in FIG. 6, process 600 may include determine, by referencing the list of SIDs, a next segment for the IP payload packet (block 620). For example, the node (e.g., using controller 420) may determine, by referencing the list of SIDs, a next segment for the IP payload packet, as described above.

As further shown in FIG. 6, process 600 may include updating a destination IP address to a particular destination IP address of a next-hop node (block 630). For example, the node (e.g., using controller 420) may update a destination IP address to a particular destination IP address of a next-hop node, as described above.

As further shown in FIG. 6, process 600 may include updating a remaining segments value, that is included in the CRH, that identifies a number of segments left in a route of the IP payload packet (block 640). For example, the node (e.g., using controller 420) may update a remaining segments value, that is included in the CRH, that identifies a number of segments left in a route of the IP payload packet, as described above.

As further shown in FIG. 6, process 600 may include providing the IP payload packet that includes the CRH to the next-hop node to allow the next-hop node to route the IP payload packet to another node in the network or to a destination device (block 650). For example, the node (e.g., using switching component 410, output component 415, controller 420, and/or the like) may provide the IP payload packet that includes the CRH to the next-hop node to allow the next-hop node to route the IP payload packet to another node in the network or to a destination device, as described above.

Process 600 may include additional implementations, such as any single implementation or any combination of implementations described below and/or in connection with one or more other processes described elsewhere herein.

In some implementations, a set of segments in the route of the IP payload packet may include strictly routed segments. In some implementations, a final segment in the route of the IP payload packet may be a strictly routed segment. In some implementations, the node may configure, before receiving the IP payload packet, a segment translation table that associates two or more of: a set of SIDs that correspond to the list of SIDs, a set of global IP addresses, a set of link-local IPv6 addresses, or a set of interface mappings.

In some implementations, when determining the next segment for the IP payload packet, the node may identify a SID, of the list of SIDs included in the CRH, that is associated with the node, and may determine the next segment by using the SID to reference a segment translation table that maps the SID to a global IP address of the next-hop node, and a link-local IPv6 address that identifies an interface of the next-hop node. The global IP address or the link-local IPv6 address may be used as the destination IP address of the IP payload packet. In some implementations, when updating the destination IP address, the node may update the destination IP address with the global IP address of the node or the link-local IPv6 address of the next-hop node based on whether the next segment is a final segment.

In some implementations, when updating the destination IP address, the node may update, based on the next segment being a final segment of the route, the destination IP address to the particular destination IP address, where the particular destination IP address is a global IP address, and where the final segment is a strictly routed segment. In some implementations, the node may determine, before determining the next segment, whether the remaining segments value included in the CRH is a non-zero value and may determine whether to continue processing the CRH or to process another header of the set of headers based on whether the remaining segments value is the non-zero value.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
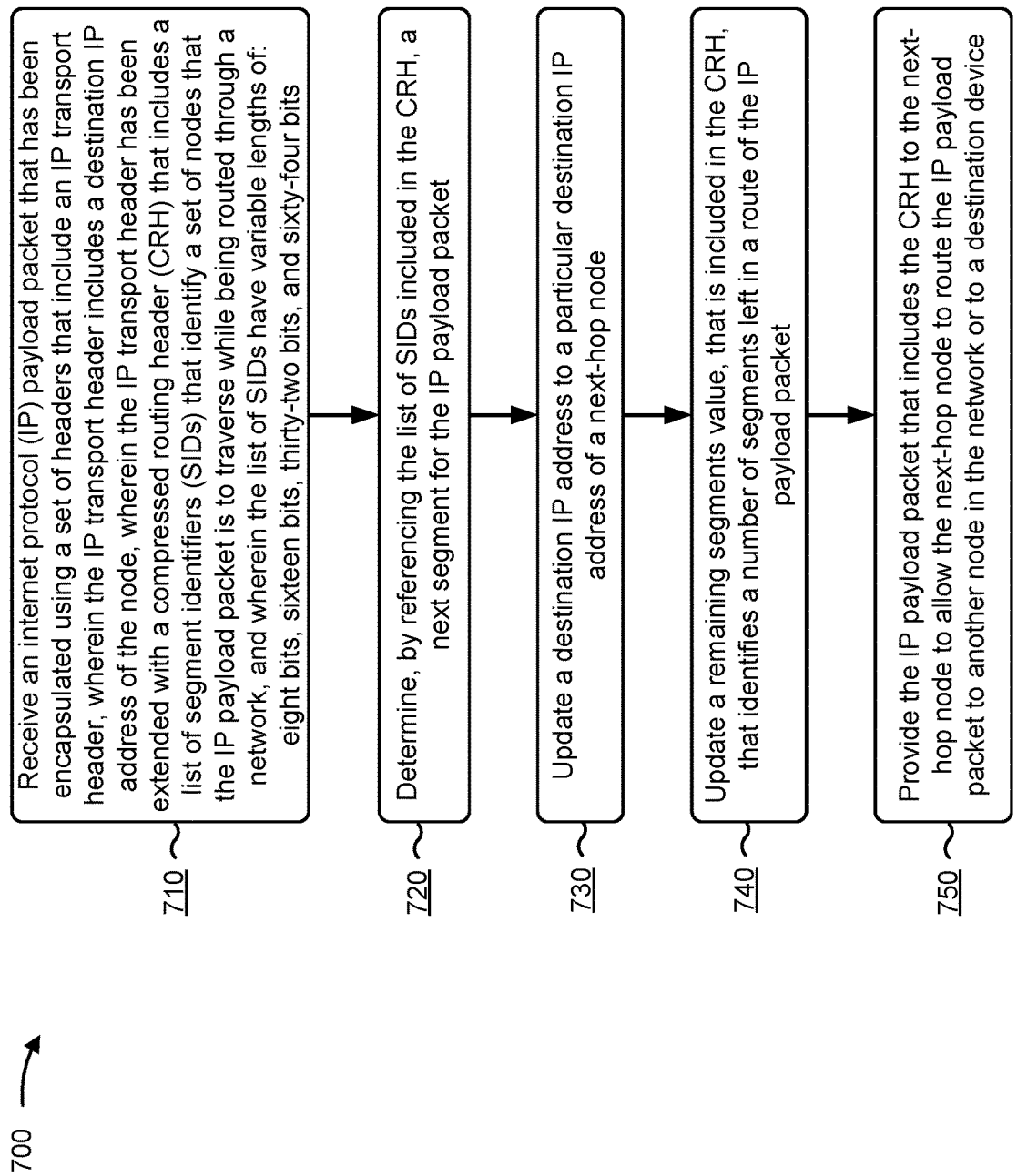

FIG. 7 is a flow chart of an example process 700 for routing a payload packet through a network using a transport header that has been extended with a compressed routing header (CRH). In some implementations, one or more process blocks of FIG. 7 may be performed by a node (e.g., node 320). In some implementations, one or more process blocks of FIG. 7 may be performed by another device or a group of devices separate from or including the node, such as a peer device (e.g., peer device 310).

As shown in FIG. 7, process 700 may include receive an internet protocol (IP) payload packet that has been encapsulated using a set of headers that include an IPv6 transport header, wherein the IPv6 transport header includes a destination IP address of the node, wherein the IPv6 transport header has been extended with a compressed routing header (CRH) that includes a list of segment identifiers (SIDs) that identify a set of nodes that the IP payload packet is to traverse while being routed through a network, and wherein the list of SIDs have variable lengths of eight bits, sixteen bits, thirty-two bits, and sixty-four bits (block 710). For example, the node (e.g., using input component 405, switching component 410, controller 420, and/or the like) may receive an IP payload packet that has been encapsulated using a set of headers that include a CRH and a destination header, as described above. In some implementations, the CRH may include a list of segment identifiers (SIDs) that identify a set of nodes that the IP payload packet is to traverse while being routed through a network, and the list of SIDs have variable lengths of eight bits, sixteen bits, thirty-two bits, or sixty-four bits.

As further shown in FIG. 7, process 700 may include determining, by referencing the list of SIDs included in the CRH, a next segment for the IP payload packet (block 720). For example, the node (e.g., using controller 420) may determine, by referencing the list of SIDs included in the CRH, a next segment for the IP payload packet, as described above.

As further shown in FIG. 7, process 700 may include updating the destination IP address to a particular destination IP address of a next-hop node (block 730). For example, the node (e.g., using controller 420) may update the destination IP address to a particular destination IP address of a next-hop node, as described above.

As further shown in FIG. 7, process 700 may include updating a remaining segments value, that is included in the CRH, that identifies a number of segments left in a route of the IP payload packet (block 740). For example, the node (e.g., using controller 420) may update a remaining segments value, that is included in the CRH, that identifies a number of segments left in a route of the IP payload packet, as described above.

As further shown in FIG. 7, process 700 may include providing the IP payload packet that includes the CRH to the next-hop node to allow the next-hop node to route the IP payload packet to another node in the network or to a destination device (block 750). For example, the node (e.g., using controller 420) may provide the IP payload packet that includes the CRH to the next-hop node to allow the next-hop node to route the IP payload packet to another node in the network or to a destination device, as described above.

Process 700 may include additional implementations, such as any single implementation or any combination of implementations described below and/or in connection with one or more other processes described elsewhere herein.

In some implementations, a set of segments in the route of the IP payload packet may include at least one strictly routed segment. In some implementations, a final segment in the route of the IP payload packet may be a strictly routed segment. In some implementations, the node may configure, before receiving the IP payload packet, a segment translation table that associates two or more of: a set of SIDs that correspond to the list of SIDs, a set of global IP addresses, a set of link-local IPv6 addresses, or a set of interface mappings.

In some implementations, when determining the next segment for the IP payload packet, the node may identify a SID, of the list of SIDs included in the CRH, that is associated with the node, and may determine the next segment by using the SID to reference a segment translation table that maps the SID to a global IP address of the next-hop node, and a link-local IPv6 address that identifies an interface of the next-hop node. The global IP address or the link-local IPv6 address may be used as the destination IP address of the IP payload packet. In some implementations, when updating the destination IP address, the node may update the destination IP address with the global IP address of the node or the link-local IPv6 address of the next-hop node based on whether the next segment is a final segment.

In some implementations, when updating the destination IP address, the node may update, based on the next segment being a final segment of the route, the destination IP address to a global IP address, where the destination IP address is updated to the global IP address and not to a link-local IPv6 address based on the next segment being the final segment of the route.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term network traffic or content may include a set of payload packets. A payload packet may refer to a communication structure for communicating information, such as a protocol data unit (PDU), a network payload packet, a datagram, a segment, a message, a block, a cell, a frame, a subframe, a slot, a symbol, a portion of any of the above, and/or another type of formatted or unformatted unit of data capable of being transmitted via a network. An internet protocol (IP) payload packet, as used herein, may refer to an IPv4 payload packet, an IPv6 payload packet, an ethernet payload packet, and/or the like.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a node, an internet protocol (IP) payload packet that has been encapsulated using an IPv6 transport header,
        wherein the IPv6 transport header includes a destination IP address of the node,
        wherein the IPv6 transport header has been extended with a compressed routing header (CRH) of variable length,
        wherein the CRH includes a list of segment identifiers (SIDs) that identify a set of nodes that the IP payload packet is to traverse while being routed through a network,
        wherein the set of nodes include the node, and
        wherein the node is configured with a segment translation table that includes one or more strictly routed segments or one or more loosely routed segments;
    determining, by the node and using the CRH, that the IP payload packet is not malformed;
    determining, by the node and based on the IP payload packet not being malformed, a next segment for the IP payload packet by referencing the segment translation table;
    updating, by the node and based on determining the next segment, the destination IP address to a particular destination IP address of a next-hop node;
    updating, by the node, a remaining segments value, that is included in the CRH, that identifies a number of segments remaining in a route of the IP payload packet; and
    providing, by the node, the IP payload packet to the next-hop node to allow the next-hop node to route the IP payload packet to another node in the network or to a destination device.

2. The method of claim 1, wherein the list of SIDs have variable lengths of:
    eight bits,
    sixteen bits,
    thirty-two bits, or
    sixty-four bits.

3. The method of claim 1, wherein a set of segments in the route of the IP payload packet include at least one of:
    a strictly routed segment of the one or more strictly routed segments, or
    a loosely routed segment of the one or more loosely routed segments.

4. The method of claim 1, wherein a final segment in the route of the IP payload packet is a strictly routed segment of the one or more strictly routed segments.

5. The method of claim 1, further comprising:
configuring the node with the segment translation table that associates two or more of:
a set of SIDs that correspond to the list of SIDs,
a set of global IP addresses,
a set of link-local IPv6 addresses, or
a set of interface mappings.

6. The method of claim 1, wherein determining the next segment for the IP payload packet comprises:
identifying a SID, of the list of SIDs included in the CRH, that is associated with the node, and
determining the next segment by using the SID to reference the segment translation table that maps the SID to:
a global IP address of the next-hop node, and
a link-local IPv6 address that identifies an interface of the next-hop node; and wherein updating the destination IP address comprises:
updating the destination IP address with the global IP address of the node or the link-local IPv6 address of the next-hop node based on whether the next segment is a final segment.

7. The method of claim 1, wherein updating the destination IP address comprises:
updating, based on the next segment being a final segment of the route, the destination IP address to a global IP address and not to a link-local IPv6 address.

8. A node, comprising:
one or more memories; and
one or more processors, to:
receive an internet protocol (IP) payload packet that has been encapsulated using an IPv6 transport header that has been extended with a compressed routing header (CRH),
wherein the CRH includes a list of segment identifiers (SIDs) that identify a set of nodes that the IP payload packet is to traverse while being routed through a network,
wherein the list of SIDs have variable lengths of eight bits to sixty-four bits, and
wherein the node is configured with a segment translation table that includes one or more strictly routed segments or one or more loosely routed segments;
determine, by the node and using the CRH, that the IP payload packet is not malformed;
determine, based on the IP payload packet not being malformed, a next segment for the IP payload packet by referencing the segment translation table;
update a destination IP address to a particular destination IP address of a next-hop node;
update a remaining segments value, that is included in the CRH, that identifies a number of segments remaining in a route of the IP payload packet; and
provide the IP payload packet to the next-hop node to allow the next-hop node to route the IP payload packet to another node in the network or to a destination device.

9. The node of claim 8, wherein a set of segments in the route of the IP payload packet includes the one or more strictly routed segments.

10. The node of claim 8, wherein a final segment in the route of the IP payload packet is a strictly routed segment of the one or more strictly routed segments.

11. The node of claim 8, wherein the one or more processors are further to:
configure, before receiving the IP payload packet, the node with the segment translation table that associates two or more of:
a set of SIDs that correspond to the list of SIDs,
a set of global IP addresses,
a set of link-local IPv6 addresses, or
a set of interface mappings.

12. The node of claim 8, wherein the one or more processors, when determining the next segment for the IP payload packet, are to:
identify a SID, of the list of SIDs included in the CRH, that is associated with the node, and
determine the next segment by using the SID to reference the segment translation table that maps the SID to:
a global IP address of the next-hop node, and
a link-local IPv6 address that identifies an interface of the next-hop node; and wherein the one or more processors, when updating the destination IP address, are to:
update the destination IP address with the global IP address of the node or the link-local IPv6 address of the next-hop node based on whether the next segment is a final segment.

13. The node of claim 8, wherein the one or more processors, when updating the destination IP address, are to:
update, based on the next segment being a final segment of the route, the destination IP address to the particular destination IP address,
wherein the particular destination IP address is a global IP address, and
wherein the final segment is a strictly routed segment.

14. The node of claim 8, wherein the one or more processors are further to:
determine, before determining the next segment, whether the remaining segments value included in the CRH is a non-zero value, and
determine whether to continue processing the CRH or to process another header of the set of headers based on whether the remaining segments value is the non-zero value.

15. A non-transitory computer-readable medium storing instructions, the instructions comprising:
one or more instructions that, when executed by one or more processors of a node, cause the one or more processors to:
receive an internet protocol (IP) payload packet that has been encapsulated using a set of headers that include an IPv6 transport header,
wherein the IPv6 transport header includes a destination IP address of the node,
wherein the IPv6 transport header has been extended with a compressed routing header (CRH) that includes a list of segment identifiers (SIDs) that identify a set of nodes that the IP payload packet is to traverse while being routed through a network,
wherein the list of SIDs have variable lengths of:
eight bits,
sixteen bits,
thirty-two bits, or
sixty-four bits, and
wherein the node is configured with a segment translation table that includes one or more strictly routed segments or one or more loosely routed segments;
determine, using the CRH, that the IP payload packet is not malformed;
determine, based on the IP payload packet not being malformed, a next segment for the IP payload packet by referencing the segment translation table;

update the destination IP address to a particular destination IP address of a next-hop node;
update a remaining segments value, that is included in the CRH, that identifies a number of segments remaining in a route of the IP payload packet; and
provide the IP payload packet to the next-hop node to allow the next-hop node to route the IP payload packet to another node in the network or to a destination device.

16. The non-transitory computer-readable medium of claim 15, wherein a set of segments in the route of the IP payload packet include at least one strictly routed segment of the one or more strictly routed segments.

17. The non-transitory computer-readable medium of claim 15, wherein a final segment in the route of the IP payload packet is a strictly routed segment of the one or more strictly routed segments.

18. The non-transitory computer-readable medium of claim 15, wherein the one or more instructions, when executed by the one or more processors, further cause the one or more processors to:
configure, before receiving the IP payload packet, the node with the segment translation table that associates two or more of:
a set of SIDs that correspond to the list of SIDs,
a set of global IP addresses,
a set of link-local IPv6 addresses, or
a set of interface mappings.

19. The non-transitory computer-readable medium of claim 15, wherein the one or more instructions, that cause the one or more processors to determine the next segment for the IP payload packet, cause the one or more processors to:
identify a SID, of the list of SIDs included in the CRH, that is associated with the node, and
determine the next segment by using the SID to reference the segment translation table that maps the SID to:
a global IP address of the next-hop node, and
a link-local IPv6 address that identifies an interface of the next-hop node; and
wherein the one or more instructions, that cause the one or more processors to update the destination IP address, cause the one or more processors to:
update the destination IP address with the global IP address of the node or the link-local IPv6 address of the next-hop node based on whether the next segment is a final segment.

20. The non-transitory computer-readable medium of claim 15, wherein the one or more instructions, that cause the one or more processors to update the destination IP address, cause the one or more processors to:
update, based on the next segment being a final segment of the route, the destination IP address to a global IP address and not to a link-local IPv6 address.

* * * * *